(12) United States Patent
Matthews et al.

(10) Patent No.: US 7,665,031 B2
(45) Date of Patent: Feb. 16, 2010

(54) METHOD AND SYSTEM OF TASKBAR BUTTON INTERFACES

(75) Inventors: David A Matthews, Seattle, WA (US); Mark R Ligameri, Snohomish, WA (US); Charles Cummins, Seattle, WA (US); Jeffrey W. Pettiross, Seattle, WA (US); R. Syam Kumar, Redmond, WA (US); Charles W. Stabb, Seattle, WA (US); Yeming Shi, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 499 days.

(21) Appl. No.: 11/006,751

(22) Filed: Dec. 8, 2004

(65) Prior Publication Data

US 2006/0123353 A1 Jun. 8, 2006

(51) Int. Cl.
*G06F 3/048* (2006.01)
(52) U.S. Cl. ........................ 715/779; 715/753
(58) Field of Classification Search ................ 715/779, 715/810, 835, 838, 840, 751, 752, 753
See application file for complete search history.

(56) References Cited

U.S. PATENT DOCUMENTS

| | | | |
|---|---|---|---|
| 5,412,776 A | 5/1995 | Bloomfield | |
| 5,499,334 A | 3/1996 | Staab | |
| 5,617,526 A * | 4/1997 | Oran et al. | 715/779 |
| 5,668,962 A | 9/1997 | Kitami | |
| 5,889,517 A | 3/1999 | Ueda et al. | |
| 5,920,316 A * | 7/1999 | Oran et al. | 715/779 |
| 6,072,486 A * | 6/2000 | Sheldon et al. | 715/835 |
| 6,160,554 A | 12/2000 | Krause | |
| 6,385,662 B1 * | 5/2002 | Moon et al. | 719/318 |
| 6,429,855 B2 | 8/2002 | Pabon | |
| 6,677,964 B1 * | 1/2004 | Nason et al. | 715/764 |
| 6,756,999 B2 * | 6/2004 | Stoakley et al. | 715/779 |
| 6,781,611 B1 | 8/2004 | Richard | |
| 6,901,558 B1 * | 5/2005 | Andreas et al. | 715/772 |

(Continued)

OTHER PUBLICATIONS

Media Control. Apr. 7, 2002. Available at: http://web.archive.org/web/20021204092105/www.truelaunchbar.com/plugins/winamp.html.*

Sharon Crawford, Using Windows Media Player 9 Series. Dec. 9, 2002. Available at: http://www.microsoft.com/windowsxp/using/windowsmediaplayer/expert/crawford_02december09.mspx.*

(Continued)

*Primary Examiner*—Kieu Vu
*Assistant Examiner*—Omar Abdul-Ali
(74) *Attorney, Agent, or Firm*—Shook Hardy & Bacon LLP

(57) ABSTRACT

The present invention provides a system or method for displaying rich presentation taskbar buttons for a corresponding application. In one example, the rich presentation taskbar button may receive content from an application through a programming interface. The present invention further relates to a system and method for displaying a rich presentation taskbar button and for displaying and/or dismissing a thumbnail of an application window associated with the rich presentation taskbar button. The present invention may further include a system and method of pinning the thumbnail on a display or dismissing a thumbnail. The present invention also relates to a system and method for displaying multiple taskbar buttons in a taskbar including controlling the size of individual taskbar buttons, consolidating taskbar buttons and placing taskbar buttons into an overflow based on the type of taskbar button in the taskbar.

26 Claims, 27 Drawing Sheets

U.S. PATENT DOCUMENTS

| | | |
|---|---|---|
| 6,918,091 B2 * | 7/2005 | Leavitt et al. ............... 715/765 |
| 2001/0028368 A1 | 10/2001 | Swartz |
| 2002/0105504 A1 * | 8/2002 | Toepke et al. ............... 345/173 |
| 2002/0163545 A1 * | 11/2002 | Hii ............................ 345/838 |
| 2004/0066408 A1 | 4/2004 | Meyers et al. |
| 2005/0114778 A1 * | 5/2005 | Branson et al. ............. 715/711 |
| 2005/0251753 A1 * | 11/2005 | Sawyer ...................... 715/765 |
| 2007/0094342 A1 * | 4/2007 | Bostick et al. .............. 709/207 |

OTHER PUBLICATIONS

Crawford, Sharon. "Using Windows Media Player 9 Series". Published Dec. 9, 2002. Available at: http://www.microsoft.com/windowsxp/using/windowsmediaplayer/expert/crawford_02december09.mspx.* http://web.archive.org/web/20021204092105/http://www.truelaunchbar.com/plugins/winamp.html. Updated Dec. 4, 2002.*

* cited by examiner

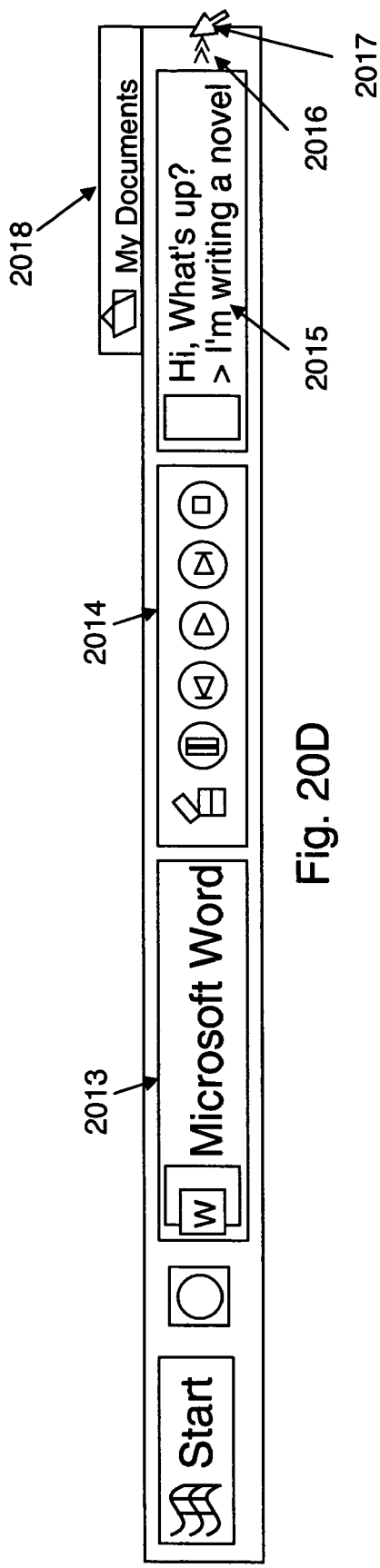
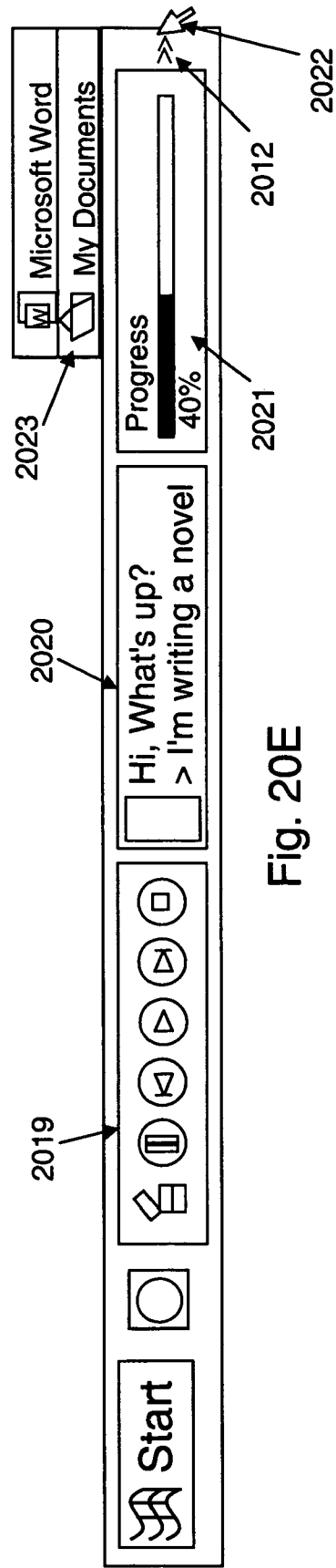
Fig. 20D
Fig. 20E

METHOD AND SYSTEM OF TASKBAR BUTTON INTERFACES

FIELD OF THE INVENTION

The present invention relates to taskbar buttons and, in particular custom user interfaces in taskbar buttons.

BACKGROUND OF THE INVENTION

On a computer, a user must typically perform multiple tasks while maintaining and utilizing applications and controlling the applications being used. The user must typically accomplish all of these numerous tasks in a limited amount of space on the display. Therefore, the user is often faced with the dilemma of not being able to perform a computer task while simultaneously controlling an application. Such shortcomings might be due, for example, to problems with limited display workspace.

Previously, systems have attempted to alleviate the problem of managing the workspace on the display by providing a mechanism by which the user may minimize windows to a taskbar. In this method, a user may minimize a window to the taskbar such that the window is no longer visible on the display and therefore does not take up significant space. In this way, the user may continue to perform the main computer task while other applications are available but not visible. However, when the application window is minimized, the user may no longer control that application without first re-opening the corresponding window. When an application window is minimized to the taskbar, the resulting taskbar button might contain the name of the application. Even though the user may determine what application is associated with a taskbar button, the user is not able to perform tasks with the application that has been minimized to the taskbar. In order to control the application, the user must re-open the application window. After performing an operation on the application in the open window, the user must then close the window again to free up workspace on the display. In so doing, the user must divert his/her attention to opening (and closing) the application window and performing steps necessary to control the application. Moreover, when the application window is re-opened, space is occupied by the re-opened window further forcing the user to suspend activities in order to manage the additional opened window.

User frustration results from this tedious and time-consuming method of minimizing application windows and re-opening (and closing/minimizing) the windows when control is desired. The user must interrupt his/her computer work in order to open and close windows. This leads to a precipitous decline in efficiency as the user wastes time managing open windows on the display.

Thus, there exists a need in the art for a system and method for providing convenient application control to a user through custom user interfaces without waste of display workspace.

SUMMARY OF THE INVENTION

Aspects of the present invention provide a system or method for displaying a rich presentation taskbar button for a corresponding application. In one example, the rich presentation taskbar button may receive content from an application through a programming interface to display the rich presentation elements. In another example, the rich presentation taskbar button comprises an interactive control display element for displaying dynamic information.

In another aspect of the present invention, a system and method are provided for displaying a taskbar button and for displaying a thumbnail of an application window associated with the taskbar button. In another aspect of the present invention, the thumbnail of the application that is displayed is associated with a rich presentation taskbar button. The present invention may further include a system and method of pinning the thumbnail on a display or dismissing a thumbnail. In another example, the thumbnail is dismissed from the display.

In another aspect of the present invention, a system and method are provide for providing a taskbar that receives taskbar thumbnail content from an application via a programming interface and displaying the thumbnail based on the thumbnail content received from the application.

The present invention further provides for displaying a rich presentation taskbar button on a taskbar with simple taskbar buttons. In one embodiment, the rich presentation taskbar button is displayed at the same size as the simple taskbar button. In another example, the rich presentation taskbar button is displayed at a size larger than the simple taskbar button. In yet another example, the taskbar buttons are combined by taskbar button consolidation. Also, a system and method for placing taskbar buttons on overflow are provided.

BRIEF DESCRIPTION OF THE DRAWINGS

FIGS. 20A-20E illustrate another example of displaying rich presentation taskbar buttons with simple taskbar buttons by placing taskbar buttons into overflow.

DETAILED DESCRIPTION

Figure 1A:
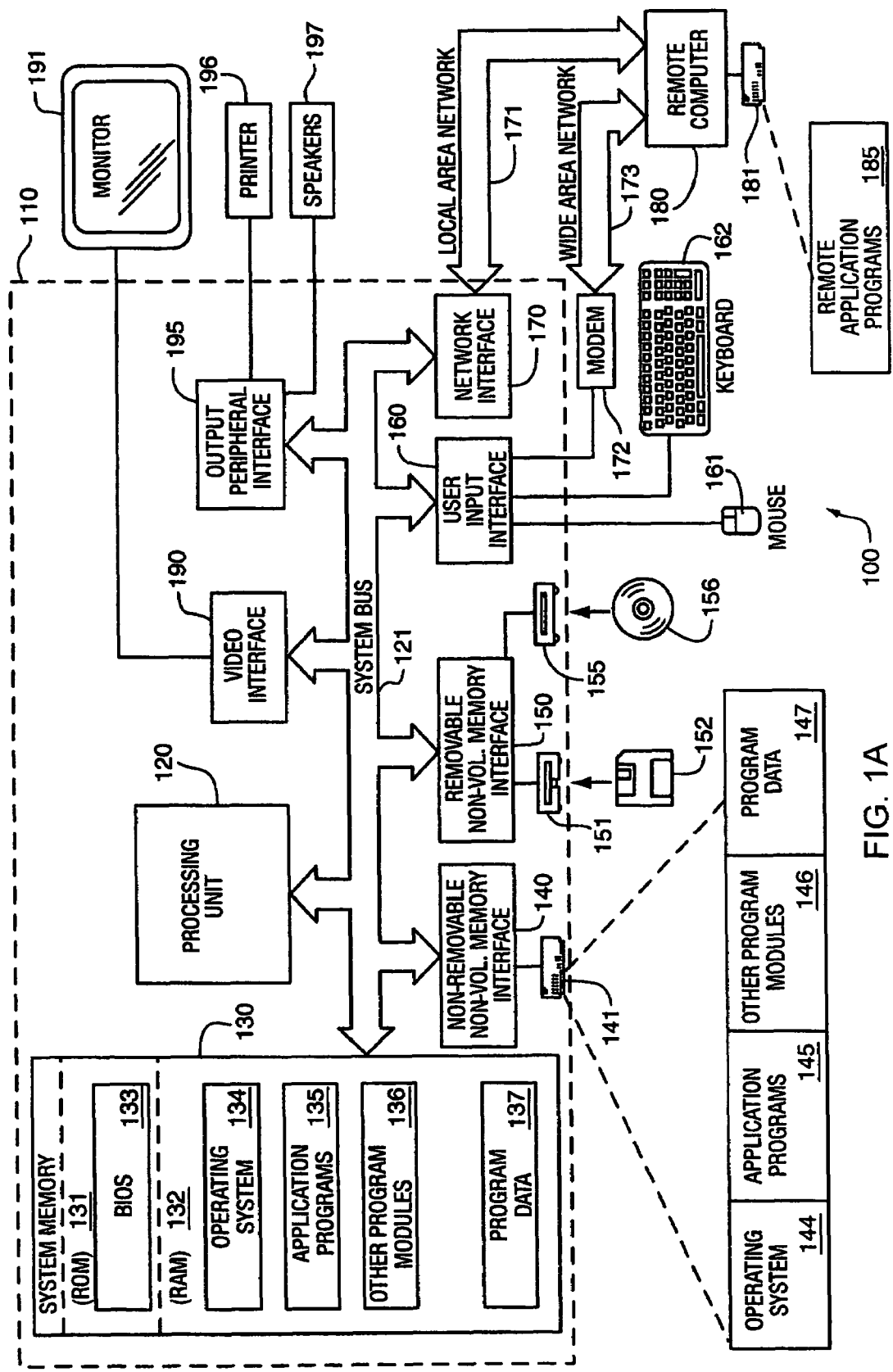
FIG. 1A illustrates an example of a system for implementing the invention which includes a general purpose computing device in the form of a computer.

Aspects of the present invention provide a system and method of providing a user with control of an application while conserving workspace. A taskbar is typically a graphical user interface on a computer that contains user interface elements that correspond to applications, windows, folders, or any other elements on a computer associated with data or data processing. A taskbar is commonly located on the lower edge of a display and may contain icons for various computer utilities. Also, a taskbar commonly contains taskbar buttons. Taskbar buttons are elements that are housed in a taskbar that provide a visual means to determine which windows or applications are currently active on the computer. Because windows or applications may be minimized on a display for a variety of reasons (e.g., to save space), it may not always be apparent which applications, for example, are active on the computer merely by examining the windows that are open on the display.

A typical taskbar button provides a user interface in the taskbar that provides the name of the active application on the computer. For example, if a media player application is active on the computer but with a minimized window, a taskbar button corresponding to the media player application may be present in the taskbar. This taskbar button that corresponds to the media player application can provide the name of the application (i.e., the words "Media Player Application", for example, may be written in the taskbar button). The taskbar may also optionally display an icon that can identify the application. For example, a trademark or logo can be present in the taskbar button to enhance user recognition of the application itself Clicking or selecting this type of taskbar button (i.e., clicking on any location in the taskbar button, for example) restores the corresponding window to the display. If the window is already open on the display but obscured by other windows, clicking the corresponding taskbar button brings the window to the front of the display such that the corresponding application window is displayed in front of the other windows on the display. Clicking the taskbar button again may, for example, minimize the window so that the window is no longer visible on the display. However, the taskbar button corresponding to the application remains in the taskbar as a visual cue that the application is still active. This standard taskbar button that contains the name of the corresponding application written thereon and optionally, a trademark or logo, and provides only the functionality of minimizing windows or opening windows that are minimized is referred to herein as a "simple taskbar button" because the simple taskbar button merely provides simple text that indicates the name of the application and an optional icon that visually identifies the application. Also, the simple taskbar button does not provide any additional functionality except for opening a minimized window (or minimizing a displayed window) and/or bringing a window to the front of a display.

In one aspect of the present invention, a rich presentation taskbar button is provided. A "rich presentation taskbar button" as provided herein contains a custom user interface containing information beyond the simple name of an application and/or an icon identifying the application. As one example, the rich presentation taskbar button may contain control display elements associated with a corresponding application to provide a user with the ability to control the operation or functionality of the corresponding application. In this example, the rich presentation taskbar button may receive user input which may control the application associated with the taskbar button. As another example, the rich presentation taskbar button may receive and provide, for example, animations, dynamic information, or any pertinent information via the corresponding application. In this example, the rich presentation taskbar button provides information to the user but does not receive input from the user.

Hence, the rich presentation taskbar button may provide a 1-way interface in which the taskbar button does not receive input from the user but provides information or data to the user (e.g., dynamic information) from the application. With such a 1-way interface, the rich presentation taskbar button may receive and present information from a corresponding application to a user. Likewise, the rich presentation taskbar button may receive input from a user to operate, control or maintain an application such as information from a user that is pertinent to a corresponding application in a 1-way interface without providing output to the user. As another example, the rich presentation taskbar may provide a 2-way interface to the associated application such that a user may input data or input commands into the rich presentation taskbar button that controls or otherwise operates the application and the application may provide information, control, functionality, animation or any pertinent information to the user from the application. This type of taskbar button is referred to herein as a "rich presentation taskbar button" because the taskbar button provides information beyond a name and/or logo/icon of an associated application and may also provide functionality beyond simply opening a minimized application window. The information or control display elements provided in the rich presentation taskbar button may be authored by the application associated with the rich presentation taskbar button. For example, the application may author the content of the associated rich presentation taskbar button and provide the information to the taskbar programming interface. In this example, the programming interface of the rich presentation taskbar receives content from the application associated with an rich presentation taskbar button and displays the rich presentation taskbar button with the content from the associated application.

In one example, the rich presentation taskbar button may contain rich presentation material such as dynamic information. This information may be provided in addition to an icon or static text that would be provided by a simple taskbar button. This type of rich presentation taskbar button can display a wide variety of information such as but not limited to multiple icons, icons of different sizes, special formatting of text, animations, scrolling text, dynamic information that is updated on an ongoing basis and that pertains to the application useful to the user, etc. Such information may include, for example, dynamic information pertaining to the application. Examples of dynamic information associated with the application that may be displayed in a rich presentation taskbar button include status information, progress meters, or other information that may be provided by the application such as securities information, weather forecast information, sports results, news events, auction results and status, application status information, buddy lists, etc.

The rich presentation taskbar button may also provide interactive controls such that the user may maintain control of the operation of the application via the rich presentation e taskbar button. This is an example of a rich presentation taskbar button with a 2-way interface. For example, the rich presentation taskbar button may contain display elements such as control icons, buttons or menus such that a process may be invoked upon activation or selection of the corresponding icon, button, or menu item within the rich presentation taskbar button. A user may click an application control button that is displayed in the rich presentation taskbar button such that the application associated with the rich presentation taskbar button may perform a task as desired by the user.

For example, a media player application may be associated with an rich presentation taskbar button of the present invention. The media player application may play various media on the computer. For example, a user may play music on the computer through the media player application (e.g., CD-ROMs, MP3, etc) or may play videos, animation, display graphical images, etc. The application window of the media player application may contain controls such that a user may, for example, click a "PLAY" button located within the application window if the user desires to listen to music, watch a video, etc. Likewise, a user may click a "STOP" button to stop the play of the media. The user may select any controls that might be provided in the application window such as "FF", "REV", "PAUSE", etc. However, if the media player application window is minimized or obscured for any reason (e.g., to save space on the display, obscured by overlapping windows, etc.), the window of the media player application is no longer visible on the display and hence, the control display elements are also typically not available to the user if the typical "simple taskbar button" is used. Thus, a user wishing to control the operation of the media player application (e.g., stop a currently playing music track, fast forward through a current music track, skip to the next or previous track, switch to shuffle play, etc), would have to open the media player application window or bring focus to the obscured media player application window before such control would be possible if a simple taskbar button is used.

The rich presentation taskbar button of this example of the present invention enables control of the corresponding application without the necessity of opening minimized windows as is the case with simple taskbar buttons. In this example, the rich presentation taskbar button contains control display elements for controlling the media player application directly through the corresponding rich presentation taskbar button. For example, the rich presentation taskbar button corresponding to a media player application may provide transport controls (i.e., "STOP", "PLAY", "FF", "REV", "PAUSE", "REC", etc) when the media application window is minimized. Therefore, control of the media application program may be performed directly through the rich presentation taskbar button and opening the corresponding media application window is unnecessary with the rich presentation taskbar button.

As another example, the rich presentation taskbar button may also provide an input means such that the user may input data into the rich presentation taskbar button that is relevant to the application associated with the rich presentation taskbar button. For example, the user may input text into the application by entering the desired text directly into the rich presentation taskbar button. The user may desire text input for a variety of reasons that may depend on the application being used. For example, when communicating via instant messaging with other users, a user may enter text into an instant messaging application window. A typical instant messaging application window contains a field in the window in which to enter text such that the text may be sent instantly to a recipient. However, if the application window for the instant messaging application is minimized for any reason (e.g., to save space on the display), if a "simple taskbar button" is used, the user would also lose the ability to continue an ongoing conversation via instant messaging. If the user wished to converse via instant messaging, the user would have to first open the instant messaging application window before the user could enter any messages to a recipient. This is because the user, who is only provided with a "simple taskbar button" of the instant messaging application, would only observe the name of the application (e.g., the words "Instant Messaging Application" displayed within the corresponding simple taskbar button). However, the simple taskbar button would not provide any additional functionality to enable the user to enter text, continue the conversation, or read any incoming messages or any part of the conversation thread.

In this example of the rich presentation taskbar button, a user may minimize an instant messaging application window (e.g., to save space on the display or to more easily perform other computer tasks). Alternatively, the instant messaging application window may become obscured by another window on the display. After the instant messaging application window is minimized (or obscured), a corresponding rich presentation taskbar button is present in the taskbar. The corresponding rich presentation taskbar button contains information and control display elements that enable additional functionality to control the operation of the instant messaging application. For example, the rich presentation taskbar button associated with the instant messaging system may provide not only the name of the application itself, but may provide a portion of a conversation thread and/or an input means such that the user may input data directly into the rich presentation taskbar button. In this example, the user may input text into the rich presentation taskbar button and send the resulting message to a recipient via the instant messaging application.

Additionally, the rich presentation taskbar button may provide information on the operation of the corresponding application. For example, the rich presentation taskbar button may provide information on the progress or status of a process that the corresponding application is performing.

As these examples illustrate, when an application is minimized to the rich presentation taskbar button, the user may continue to control the application through the rich presentation taskbar button without the need of maximizing the window or, if the application window is open but obscured by another display element such as an overlapping window, without the need of removing the obscuring display element.

In one aspect of the present invention, the user performs a computer task. The computer task may require at least one open window on the display. For example, the user may be running a first application, such as but not limited to word processing via a word processing program. The word processing program displays a window on the display in which the user may type characters or edit written material. However, the window associated with the word processing program requires real estate on the display. Therefore, if a second application that displays windows on the display is simultaneously active, there may be interference between the window(s) of the first application and the window(s) of the second application.

In this example, the user's first priority may be to complete the primary computer task. If that is the case, the user may focus on the first application and minimize the window of the second application. Also, if additional applications are active, the user may also minimize the window(s) of any additional applications as well as the window(s) of the second application. Thus, the user may work in the first application and minimize the windows of all other active applications while engaged in the primary computer task. Even if the other active application windows are not minimized, the first application window have focus such that the first application window may obscure the other active application windows. In this way, the other active application windows are not accessible to the user because they are either minimized or obscured by other windows. Instead, the applications associated with the other active application windows (either minimized or obscured) are displayed as taskbar buttons. In this way, the user may continue to perform the primary computer task (e.g., word processing) without interference from the windows of the other active applications.

However, if the user desires to perform an operation or obtain information regarding the second application or any other application in which the window is minimized or obscured, the user would typically have to first either open the associated window or otherwise bring the associated window into full view on the display if a simple taskbar button is used. For example, if the user wishes to perform an operation in the second application, the user would typically have to first cause the associated window of the second application to be displayed in full (e.g., maximize the window or bring the display of the window to the front), then perform the operation in the second application with the window of the second application fully visible and accessible. Because the accessible window of the second application may obscure the window of the first application, the user would then have to close or minimize the window of the second application after the operation on the second application is complete to free up space on the display to continue performing the primary computer task in the first application. Alternatively, the user may bring the window of the first application to the front to obscure the window of the second application.

In this aspect of the present invention, the user may leave the window of the second application minimized or obscured and still perform the operation in the second application. For example, the user may control the application through the associated rich presentation taskbar button of the present invention. Hence, the window of the second application need not be maximized or brought to the front of the display prior to performing the operation on the second application. In this way, the user may save time and effort by conveniently performing the operation on the second application. At the same time, the user may quickly return to the primary activity with the first application.

In another aspect of the present invention, windows switching capabilities are provided in the rich presentation taskbar buttons. In a non-limiting example, the rich presentation taskbar button may contain a predetermined area. The predetermined area in the rich presentation taskbar button may be selected to provide window management functionality. For example, a user may click on a predetermined area in the rich presentation taskbar button to maximize or otherwise bring the window associated with the rich presentation taskbar button into view if the window is currently minimized or otherwise obscured. For example, clicking on the predetermined area can maximize a minimized window associated with a rich presentation taskbar button. Alternatively, clicking on the icon may minimize a window associated with the application if the window is maximized or cause the visible and accessible window to be displayed behind other display elements. As another example, the user may click in a predetermined area in the rich presentation taskbar to maximize or minimize the window associated with the application. In one embodiment, the predetermined area is at an edge of the rich presentation taskbar button closest to the side of the screen.

In another aspect of the present invention, a thumbnail associated with a taskbar button is provided. This taskbar button may be a rich presentation taskbar button of the present invention or may be any taskbar button associated with an application, folder or display element. A thumbnail may be displayed corresponding to the window associated with the selected taskbar button. For example, a user may select a rich presentation taskbar button that is associated with an application window to cause the display of a thumbnail of the application window. The thumbnail of the application window may appear anywhere on the display. For user convenience, the thumbnail of the application window is preferably displayed adjacent to the associated taskbar button. For purposes of displaying the thumbnail, the user may "select" the associated taskbar button in a variety of ways. For example, the user may hover a cursor over the taskbar button to "select" the taskbar button for the purpose of displaying the thumbnail. Alternatively, the taskbar button may contain a button or an icon such that clicking the button or icon causes the corresponding thumbnail to appear on the display.

The displayed thumbnail may take many forms. For example, the thumbnail may be a miniature version of the full window or the client area of the window. The thumbnail may also contain a title bar for easy identification of the window by the user. Depending on the application associated with the thumbnail, the thumbnail may also contain dynamic information or information that changes in real-time to reflect the content of the window. The taskbar button may provide a programming interface such that an application associated with the taskbar button may provide content information authored in the application to the taskbar API that specifies the content of the thumbnail. Thus, the content of the thumbnail may be customized by the application to provide improved information with enhanced relevance to the particular application.

In another aspect of the present invention, the thumbnail may be dismissed by moving the cursor away from the location from which the thumbnail was invoked. For example, if the cursor hovers over a predetermined location (e.g., the corresponding taskbar button) and causes the thumbnail to be displayed, the thumbnail may be dismissed by moving the cursor away from the predetermined location. In this way, the thumbnail does not interfere with other display elements such as windows.

In another aspect of the present invention, the thumbnail may be pinned to the display such that the thumbnail does not disappear by only moving the cursor away from the area. Instead, the thumbnail remains visible even after the cursor is moved away and is not hovering over the predetermined location. This allows the user to work in one window while retaining access to the thumbnail of another window. It may be desired to dismiss a thumbnail when the thumbnail is open. By "dismiss", it is meant that the thumbnail is removed from the visual display. Thus, after a thumbnail is "dismissed," the thumbnail is no longer visible on the display. When it is desired to dismiss a thumbnail that is pinned open, a cursor may be moved over a location to close the thumbnail. For example, an area (e.g., a "close" button) on the thumbnail may be present for closing the thumbnail such that when the area is clicked, the thumbnail is dismissed. Alternatively, the thumbnail may be dismissed by hovering the cursor of a predetermined location on the thumbnail.

In another aspect of the present invention, a cursor may be hovered over a location to display a thumbnail associated with a taskbar button such as a rich presentation taskbar button or a cursor may be removed from the location after a thumbnail is displayed. However, in this example, the thumbnail is displayed or dismissed, respectively, only after a predetermined period of time elapses. In this way, the thumbnail is not displayed or dismissed accidentally or prematurely.

In another aspect of the present invention, the rich presentation taskbar button associated with the application window is altered based on the other taskbar buttons in the taskbar through scaling of the taskbar button(s). As additional taskbar buttons are added to the taskbar, the taskbar buttons associated with the application windows may adapt to the space available on the taskbar. The additional taskbar buttons or the taskbar buttons already on the taskbar may, for example, decrease in size or decrease in width in order to fit on the taskbar. Alternatively, the taskbar button may combine through taskbar button consolidation with other taskbar buttons, i.e., the taskbar button may merge with other selected taskbar buttons to form one combination taskbar button among the merged taskbar buttons. In another embodiment, the taskbar button may be placed in an "overflow" location, e.g., a menu or taskbar scrolling mechanism, when necessary.

The size of the rich presentation taskbar button of the present invention may be altered in different ways. The rich presentation taskbar button may shrink in approximately the same proportion as simple taskbar buttons. In this example, each of the taskbar buttons in the taskbar is substantially the same size. In another example, the rich presentation taskbar button may shrink up to a predetermined limit but remain constant in size after the predetermined limit is reached. The rich presentation taskbar button, therefore, does not shrink beyond this limit. This may be useful depending on the content of the rich presentation taskbar button. If the rich presentation taskbar button contains a large amount of content, for example, the rich presentation taskbar button may not be useful if it shrinks excessively. In this case, the rich presentation taskbar button is prevented from shrinking excessively and still provides useful user interface.

In another example, the rich presentation taskbar button of the present invention does not shrink in size. Instead, the simple taskbar buttons shrink in size. In this way, the rich presentation taskbar button still provides useful user interface to the user while remaining on the taskbar. As additional taskbar buttons are added to the taskbar, additional space is provided to the rich presentation taskbar button by shrinking of the simple taskbar buttons.

In another example, the rich presentation taskbar button shrinks to fit on the taskbar as additional taskbar buttons are added to the taskbar, however, the rich presentation taskbar button shrinks only after the other (simple) taskbar buttons on the taskbar have shrunk.

Instead of shrinking, the rich presentation taskbar button may combine by taskbar button consolidation with other taskbar buttons, i.e., merge with other taskbar buttons. In this way, space on the taskbar is conserved as multiple taskbar buttons become one taskbar button. In one example, the rich presentation taskbar button is not combined or consolidated with other taskbar buttons. Space on the taskbar is obtained by combining or consolidating simple taskbar buttons. In this way, the user interface in the rich presentation taskbar button is preserved.

In another example, the rich presentation taskbar button may combine by taskbar button consolidation with other buttons but only after other taskbar buttons have combined. In this way, the rich presentation taskbar button will not combine with other taskbar buttons until space is limited and the maximum amount of space has been obtained already by combining other taskbar buttons.

Alternatively, the rich presentation taskbar button may combine by taskbar button consolidation with other taskbar buttons to preserve space on the taskbar as additional taskbar buttons are added to the taskbar.

The present invention may be implemented in an operating environment. FIG. 1 illustrates an example of a suitable operating environment 100 in which aspects of the present invention may be implemented. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media includes both volatile and nonvolatile media, removable and non-removable media. By way of example, and not limitation, computer readable media may comprise computer storage media and communication media and includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

In an aspect of the present invention, a custom user interface is provided in a taskbar button associated with an application. The custom user interface in the taskbar button may provide content that may be specified by the application itself. For example, the taskbar may contain a programming interface such that applications may author content and provide the content to the programming interface for display.

A programming interface (or more simply "interface") may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
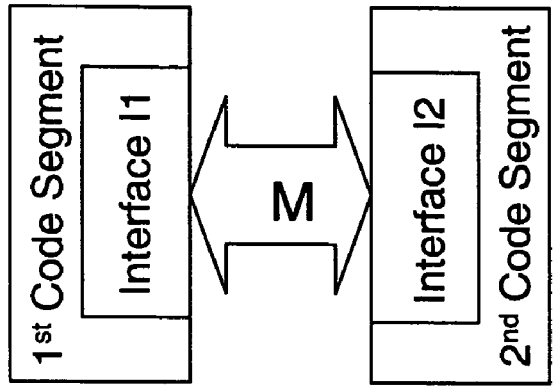
FIGS. 1B through 1M show a general-purpose computer environment supporting one or more aspects of the present invention.
Figure 1E:
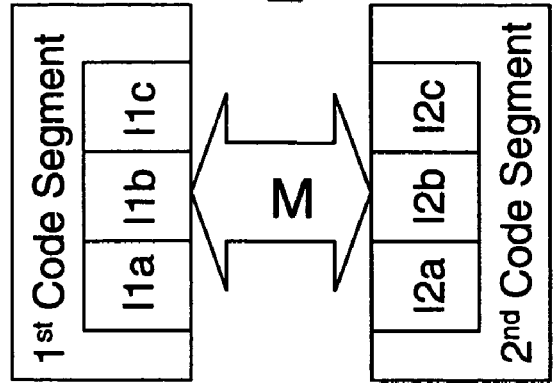
Figure 1B:
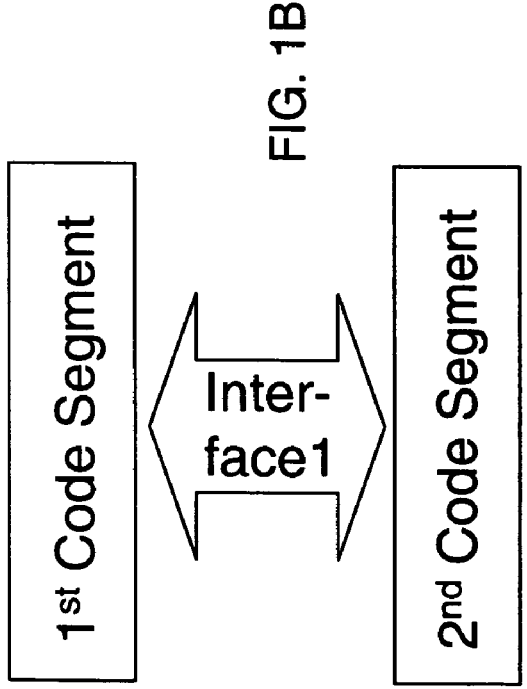

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
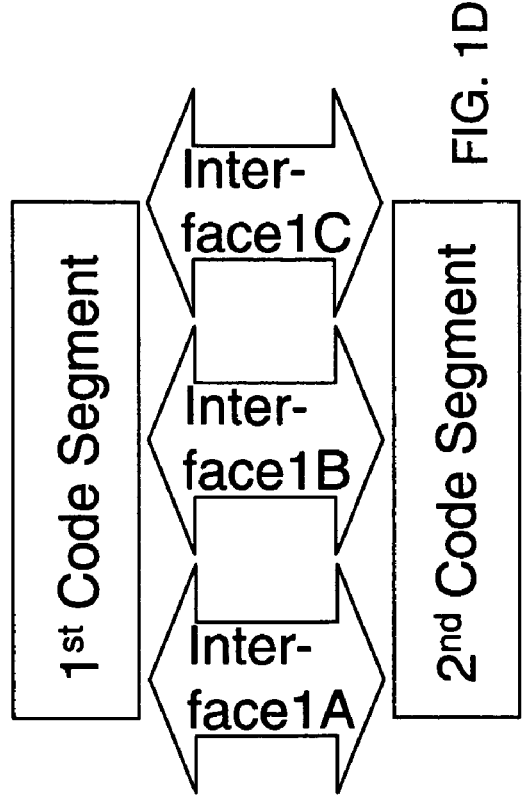

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1F:
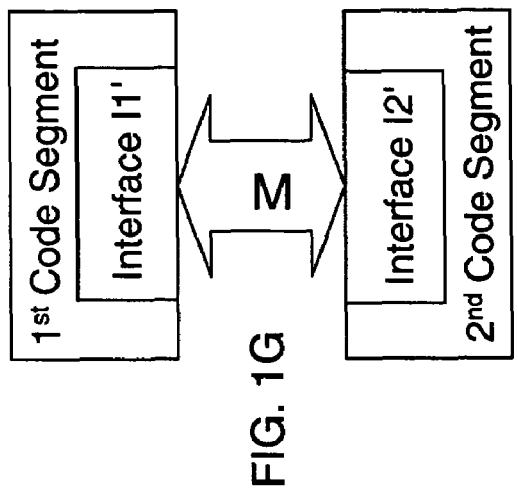
Figure 1G:
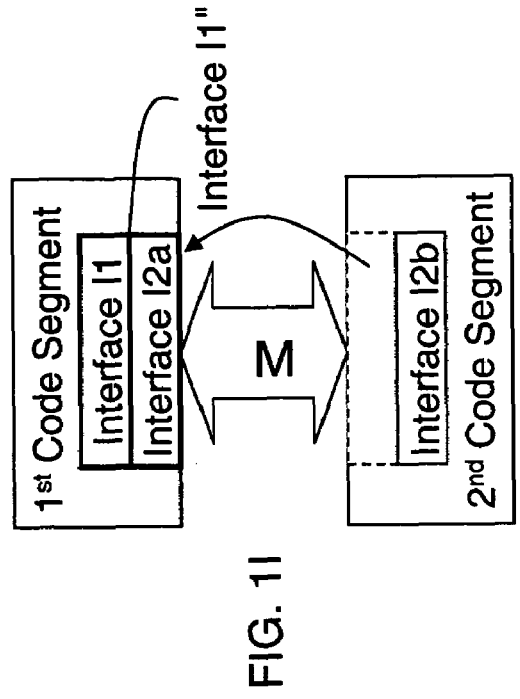

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
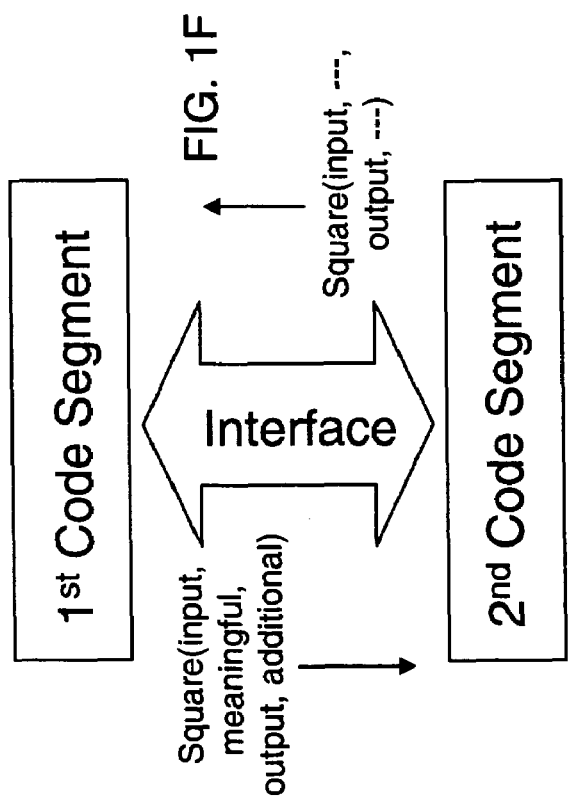
Figure 1I:
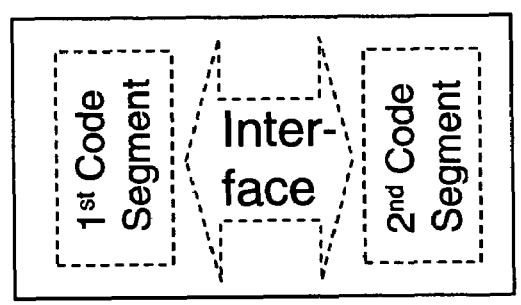

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 1C performs a function call square (input, output), which is received by interface I2, which after processing the value passed with input (to calculate the square of an input) by the second code segment, passes back the squared result with output. In such a case, the processing performed by the second code segment (squaring input) can be performed by the first code segment without a call to the interface.

D. Divorce

Figure 1K:
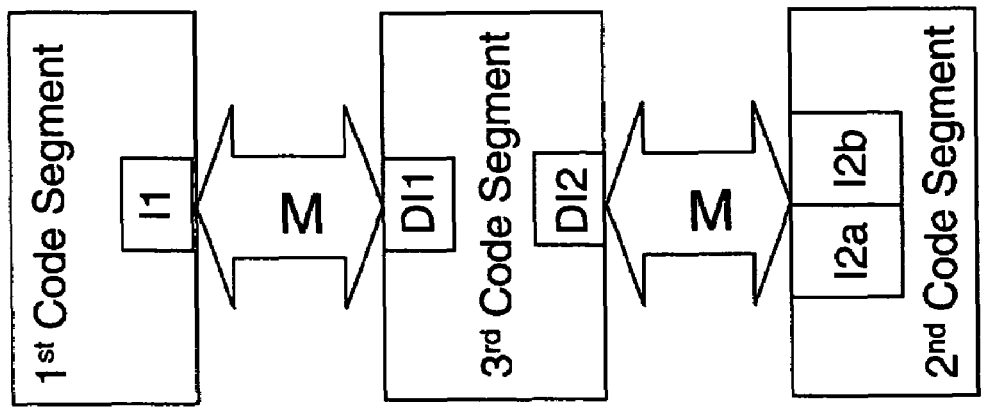
Figure 1J:
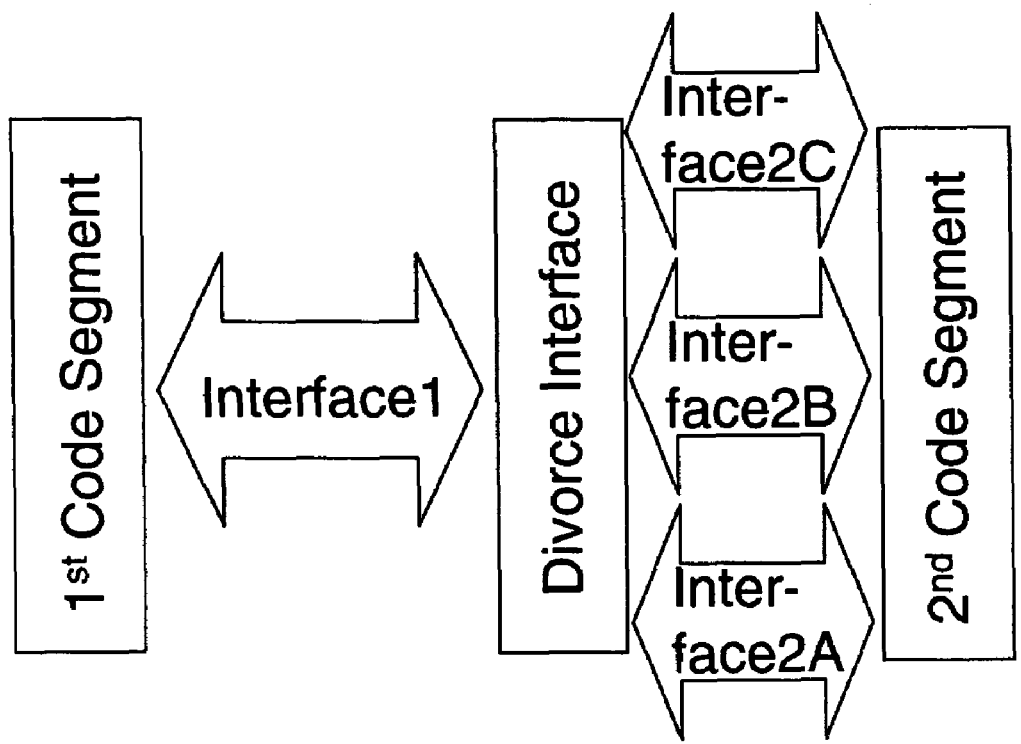

A communication from one code segment to another may be accomplished indirectly by breaking the communication into multiple discrete communications. This is depicted schematically in FIGS. 1J and 1K. As shown in FIG. 1J, one or more piece(s) of code (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
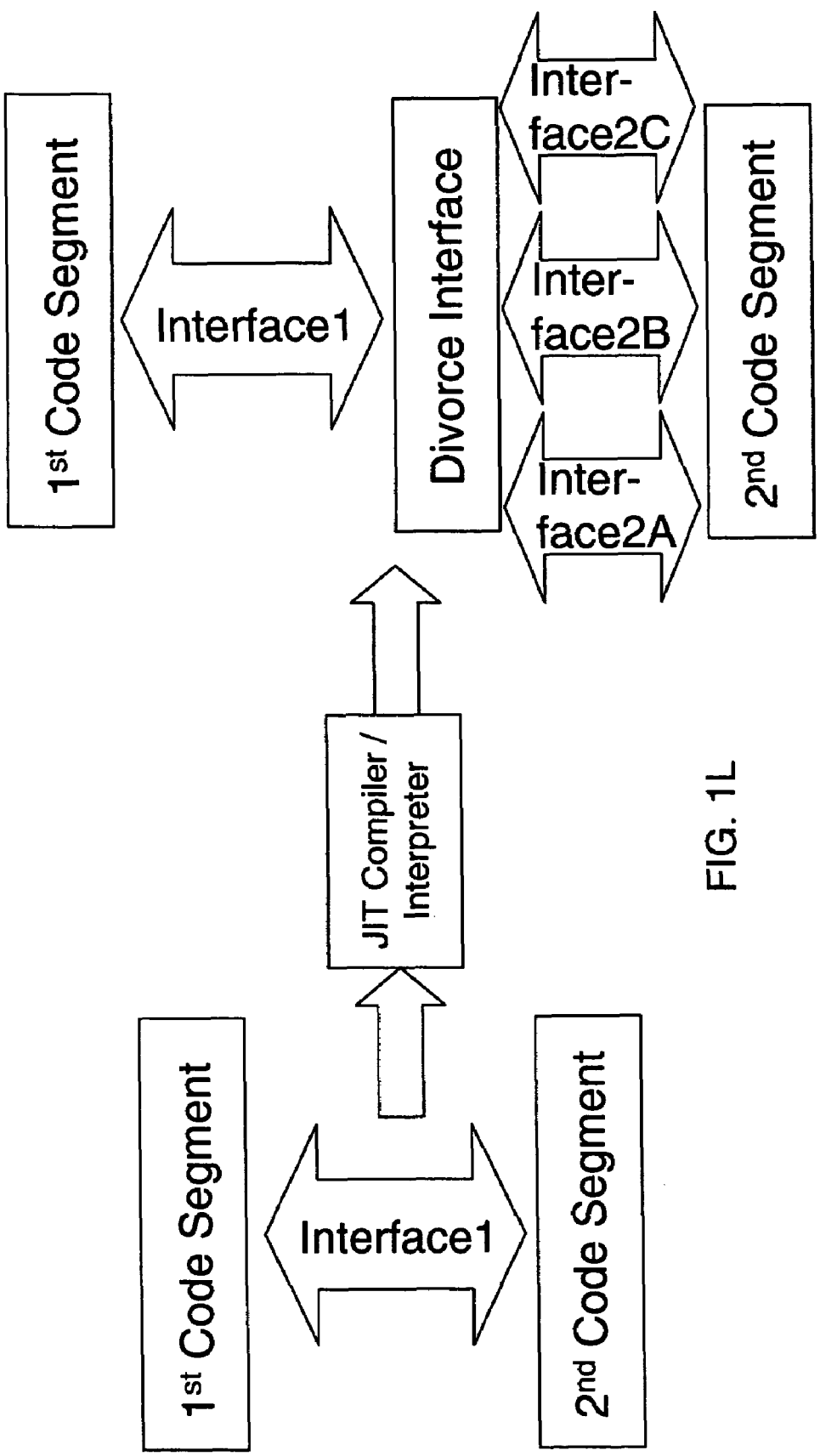
Figure 1M:
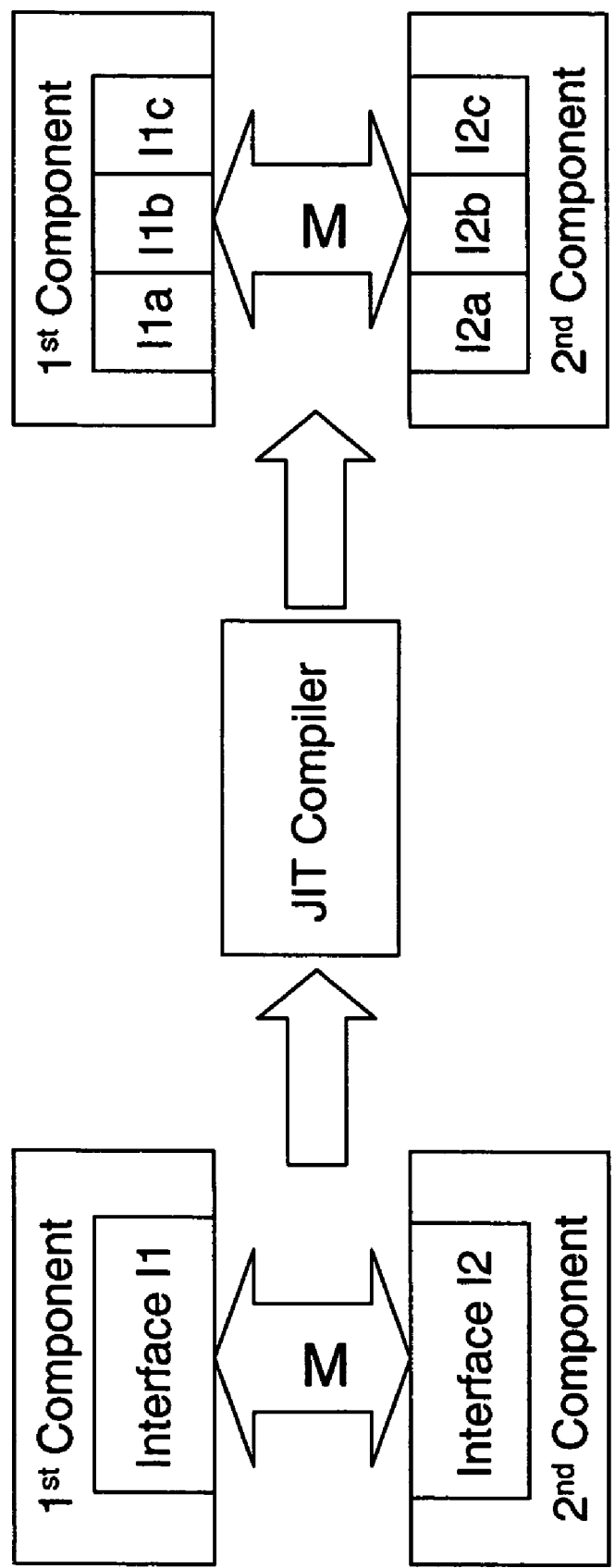

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Figure 2:
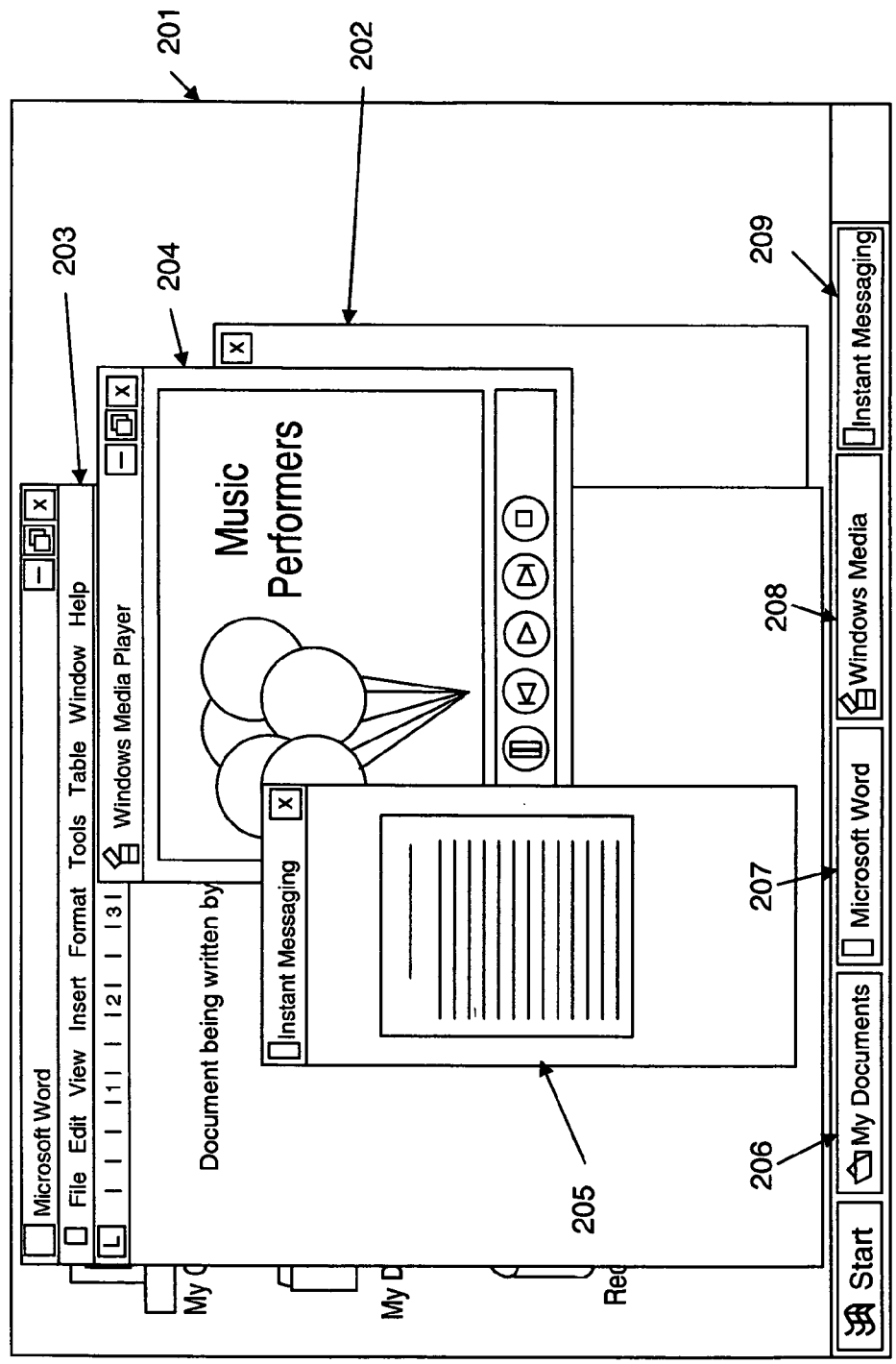
FIG. 2 illustrates an example of an aspect of the present invention in which open windows are displayed on a display.

FIG. 2 illustrates a display 201 with open windows. The display 201 contains a window of a storage site for the computer. For example, a window for a folder containing stored elements may be displayed. In the example illustrated in FIG. 2, the folder is a "My Documents" folder that is displayed on the display 201 in a "My Documents" window 202. The "My Documents" window 202 is partially obscured by other open windows. The other open windows illustrated in FIG. 2 include a word processing application window 203, which is partially obscured by a Media Player window 204 and an Instant Messaging window 205. Each of the windows on the display 201 is associated with a corresponding taskbar button. In this example, each of the taskbar buttons are "simple taskbar buttons". Each of the simple taskbar buttons in this example displays the name of the corresponding application or folder name. For example, the "My Documents" window is associated with the "My Documents" simple taskbar button 206 which displays the name "My Documents", the word processing application window 203 is associated with a simple taskbar button 207 which displays the name "Microsoft Word", the Media player window 204 is associated with a simple taskbar button 208 which displays the name "Windows Media" and the Instant Messaging window 205 is associated with a simple taskbar button 209 which displays the name "Instant Messaging".

Figure 3:
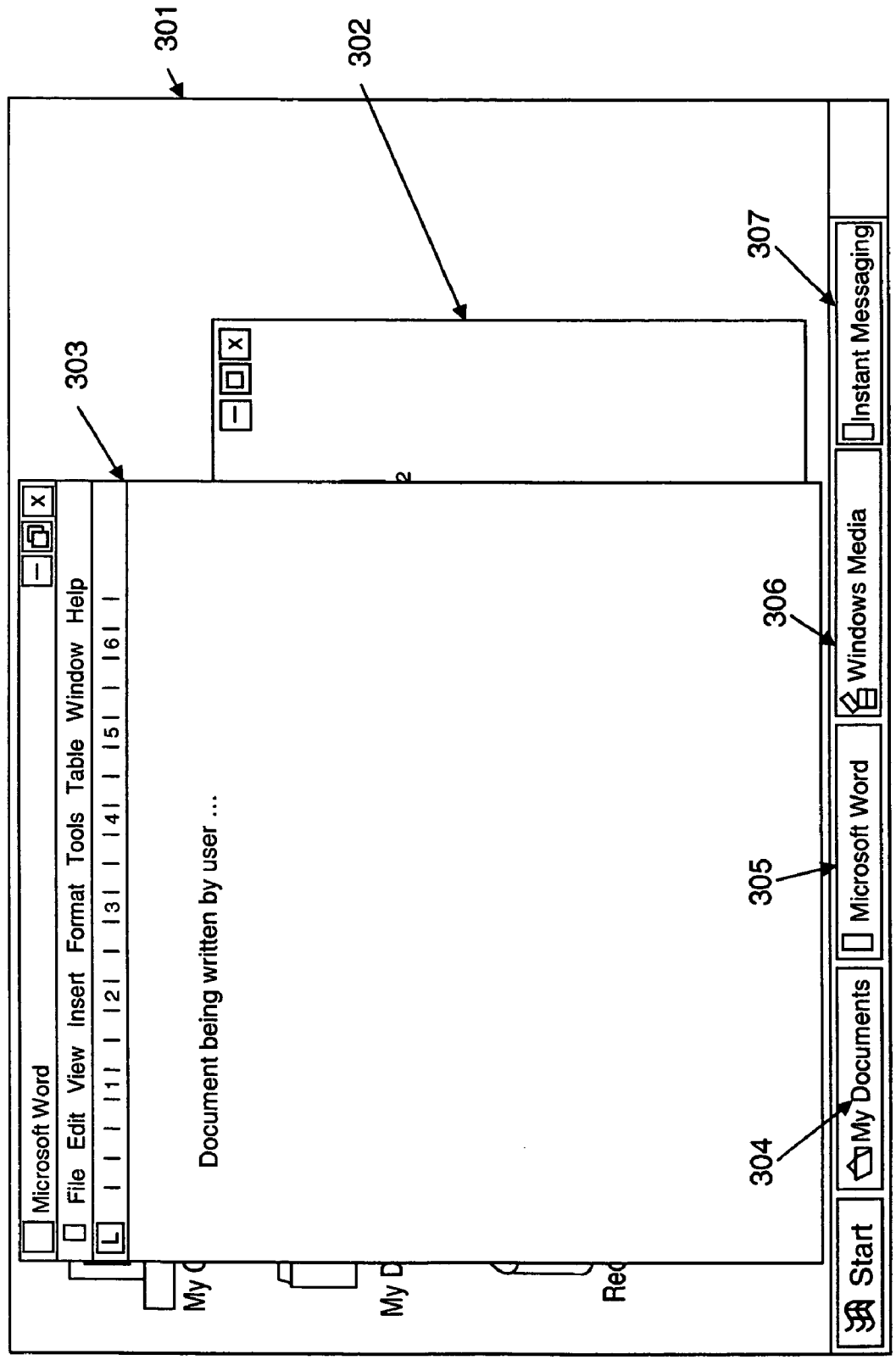
FIG. 3 illustrates an example of an aspect of the present invention in which windows on a display are minimized or obscured.

FIG. 3 illustrates an example of minimizing the windows on a display. In FIG. 3, a display 301 is illustrated that contains windows. Two windows are illustrated as being open and visible on the display 301. The visible windows in this example are the window associated with a folder (in this case, "My Documents" window 302) which is partially obscured by the word processing application window 303 because the word processing application window 303 sits on top of the "My Documents" window 302. The "My Documents" window 302 is associated with a simple taskbar button 304 and the word processing application window is also associated with a corresponding simple taskbar button 305. The application windows of the Media player application and the instant messaging window are not seen in FIG. 3 because they have been minimized. However, the corresponding simple taskbar buttons of the Media player application 306 and the Instant Messaging application 307 are seen in the taskbar of the display 301 illustrated in FIG. 3.

Figure 4:
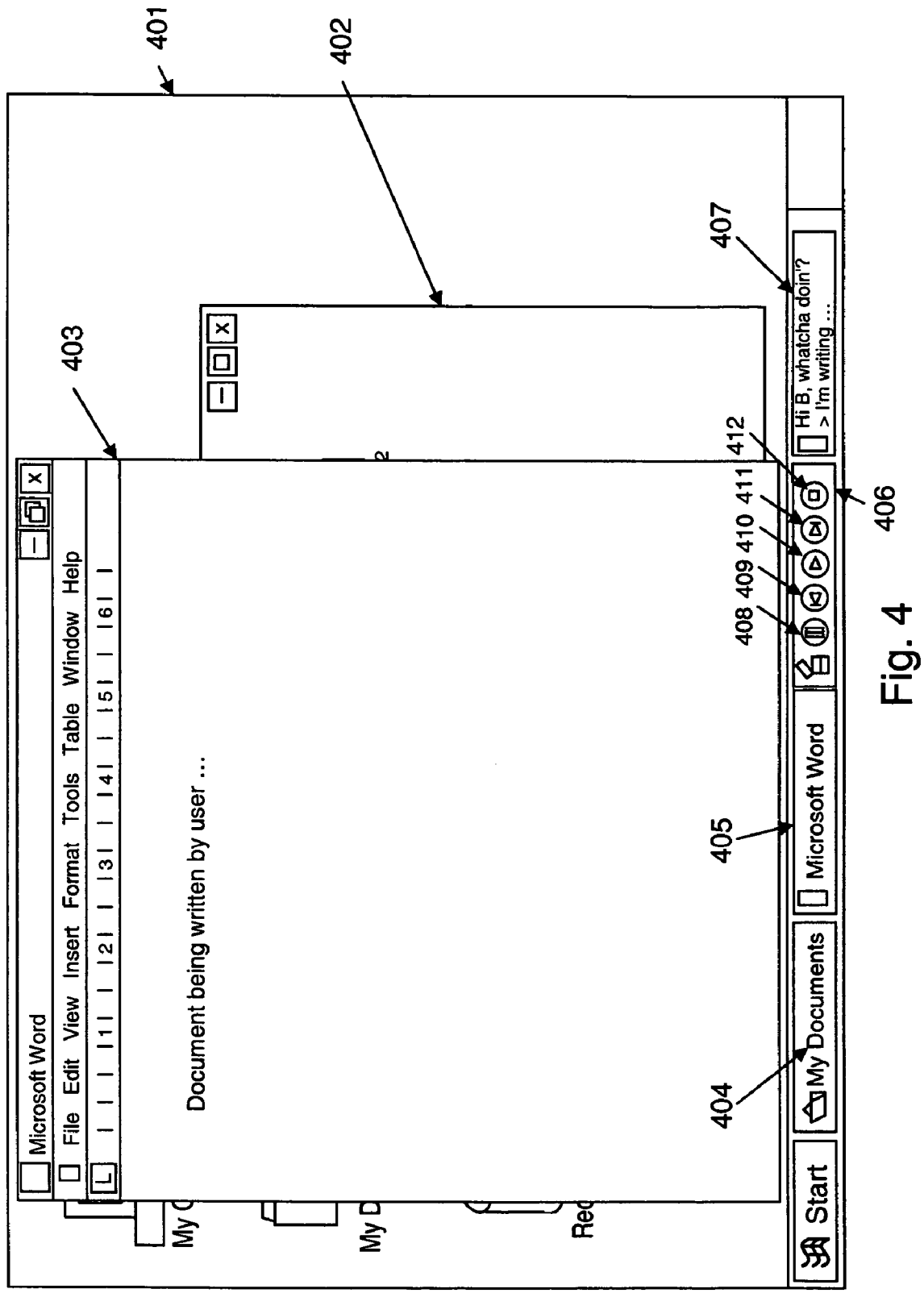
FIG. 4 illustrates an example of an aspect of the present invention in which rich presentation taskbar buttons are displayed.

FIG. 4 illustrates an example of a display of rich presentation taskbar buttons of the present invention. The rich presentation taskbar button in this example contains information or control display elements that are associated with a corresponding application that provides a user with the ability to control the operation or functionality of the corresponding application. The display 401 contains open windows. In this example, a file folder (e.g., "My Documents" window 402) and a word processing application window 403 is present on the display 401. Each of the windows, i.e., the "My Documents" window 402 and the word processing application window 403, is associated with a simple taskbar button (404 and 405, respectively). The simple taskbar buttons 404 and 405 are illustrated in the taskbar of the display 401. In addition, the taskbar buttons for a media player application 406 and an instant messaging application 407 are also present in the taskbar. As FIG. 4 illustrates, the taskbar buttons associated with the media player application 406 and the instant messaging application 407 are rich presentation taskbar buttons. Corresponding windows for the media player application or the instant messaging application are not present on the display because the windows have been minimized. However, the respective rich presentation taskbar buttons (406 and 407) are visible in the taskbar.

In this example, the rich presentation taskbar button of the media player application 406 contains control display elements that provide a user with control of the operation/functionality of the media player application. In this example, the rich presentation taskbar button 406 contains buttons that perform an operation in the application upon selection. In this example, the rich presentation taskbar button 406 contains user interface buttons for transport control (i.e., "PLAY", "STOP", "FF", "REV", etc.). The buttons for transport control include buttons for playing 410, rewinding or replaying a track 409, fast forwarding or skipping a track 411, pausing 408 or stopping 412, for example. FIG. 4 is only an example of the types of display elements that may be used to control an application. The media player application rich presentation taskbar button 406 may contain many other controls such as but not limited to record or scan.

FIG. 4 also illustrates a rich presentation taskbar button 407 associated with an instant messaging application. The rich presentation taskbar button contains a type of dynamic information in which the information in updated on an on-going basis. In this example, the instant messaging application contains text information between multiple users. The rich presentation taskbar button 407 provides a portion of the conversation thread. In this example, even though the window of the instant messaging application is minimized such that the window is not visible, the user may read incoming messages in the associated rich presentation taskbar button 407. In this way, the user may continue a conversation with another user while the window of the instant messaging is minimized by reading a display of incoming messages in the taskbar button and entering dialog or text into the taskbar button in response. FIG. 4 illustrates an example of an on-going conversation in a taskbar button 407. The rich presentation taskbar button 407 provides information that is periodically updated with dynamically changing data (i.e., updating the message lines in a conversation as the conversation progresses).

In another example, the rich presentation taskbar buttons may display information, control display elements or dynamic information for updating only when the corresponding window is minimized or obscured by overlapping windows. For example, a media player window may be minimized (e.g., to save space on the display) such that the media player window is not visible on the display even though the media player application is still active on the computer. When the media player application window is minimized, the corresponding rich presentation taskbar button may display the control display elements as depicted in FIG. 4. Alternatively, the media player application window remains on the display but is obscured by other display elements. The rich presentation taskbar button associated with the obscured application window may also display elements as depicted in FIG. 4. In this example, the rich presentation taskbar button displays transport controls such that the user may control the operation of the application (e.g., PLAY, STOP, etc.) by clicking the corresponding control display element in the rich presentation taskbar button. In this example, when the media player application window is restored to the display (e.g., by clicking a predetermined location on the rich presentation taskbar button), the rich presentation taskbar button associated with the media player application may convert to a simple taskbar button. When the media player application window is minimized or when the media player application window is obscured by overlapping display elements on the display (e.g., other windows), the simple taskbar button associated with the media player application may convert to a rich presentation taskbar button. Thus, the user may continue to control the media player application in this example, even though the window is either minimized, obscured by other display elements, or is otherwise inaccessible.

Figure 5:
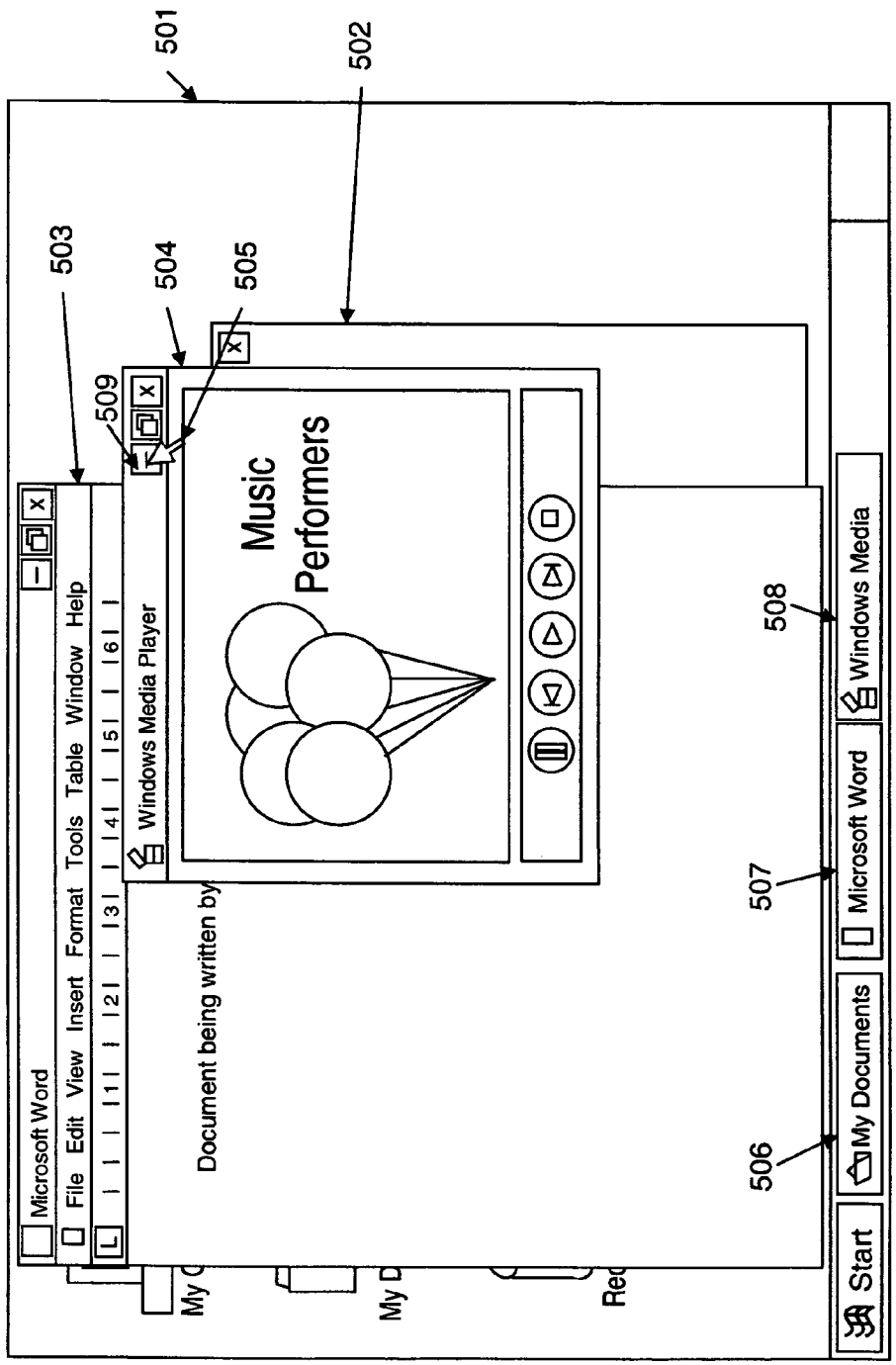
FIG. 5 illustrates an example of an aspect of the present invention in which windows are shown on a display with taskbar buttons.

FIG. 5 illustrates an example of a display where the windows are displayed. As FIG. 5 illustrates, the display 501 contains multiple windows. A "My Documents" window 502 is displayed on the display 501 and is associated with a simple taskbar button 506 in the taskbar. The simple taskbar button 506 associated with the folder (e.g., "My Documents" window 502) displays the name of the folder. Also, clicking on the simple taskbar button 506 causes the folder window (in this example, the "My Documents" window) to minimize. If the window is already minimized, clicking on the simple taskbar button 506 causes the window to be restored to the display/desktop. A word processing application window 503 is also displayed on the display 501 and is associated with a simple taskbar button 507 in the taskbar. The simple taskbar button 507 also displays the name of the corresponding application. In this case, the simple taskbar button 507 displays the words "Microsoft Word". FIG. 5 also illustrates a window of a media player application 504 displayed on the display 501. The media player application taskbar button 508 provides an appearance of a simple taskbar button in that the taskbar button 508 displays only the name of the corresponding application (i.e., "Windows Media"). In addition, the taskbar button displays a logo to assist in identification of the associated application. Alternatively, the taskbar button 508 may be a rich presentation taskbar button and provide control display elements such as transport controls for a media player application. However, in this example, the taskbar button 508 associated with the media player application 504 provides a simple taskbar button appearance and does not contain information beyond the name of the application and/or a logo identifying the application such as control display elements for controlling the corresponding media player application while the window 504 is open on the display 501.

As FIG. 5 illustrates, a cursor 505 is positioned on the minimize box 509 of the media player application window 504. If the minimize box 509 is activated or selected, the window 504 will not be displayed on the display 501 but the taskbar button 508 will remain in the taskbar.

Figure 6:
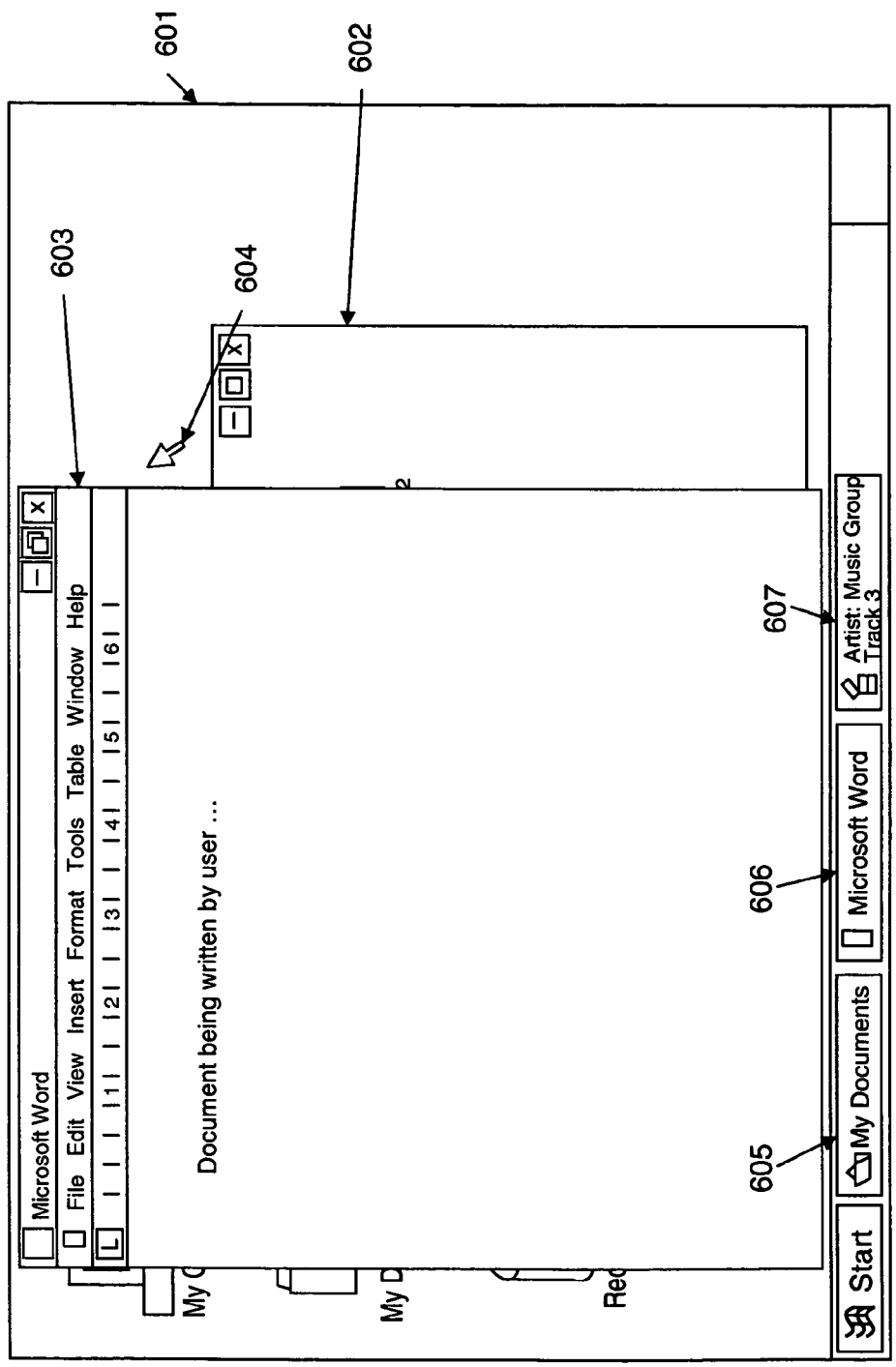
FIG. 6 illustrates an example of an aspect of the present in invention in which a rich presentation taskbar button corresponding with a minimized or obscured window is displayed with a control interface.

FIG. 6 illustrates the display illustrated in FIG. 5 after the media player application window is minimized. In FIG. 6, a display 601 contains open windows. A window for a folder on the computer (e.g., "My Documents" window 602) is present on the display and is associated with a corresponding simple taskbar button 605. The "My Documents" window is partially obscured by a word processing application window 603 that is also open and visible on the display 601. The word processing application window 603 is also associated with a simple taskbar button 606 that is displayed in the taskbar. The media player application window (not shown) is not visible on the display 601 because the media player application window has been minimized. In this example, the media player application window is minimized by clicking the minimize window box with a cursor 604. A taskbar button 607 associated with the media player application is still present in the taskbar, however the taskbar button 607 illustrated in the example of FIG. 6 has been converted to a rich presentation taskbar button 607. The rich presentation taskbar button 607 of this example provides dynamic information that may be updated. In this case, the dynamic information provided in the rich presentation taskbar button 607 is the name of the artist and the track number of the music selection being played.

In this example, the rich presentation taskbar button 607 associated with the media player application contains rich presentation information that is pertinent to the media player application and may be updated on an on-going basis. As FIG. 6 illustrates, the artist's name and the track number is provided in the taskbar button in this example. This information may be updated as the track may change as well as the artist. FIG. 6 illustrates one implementation of the present invention. However, the present invention is not so limited as the rich presentation taskbar button may provide any enhanced information.

Figure 7:
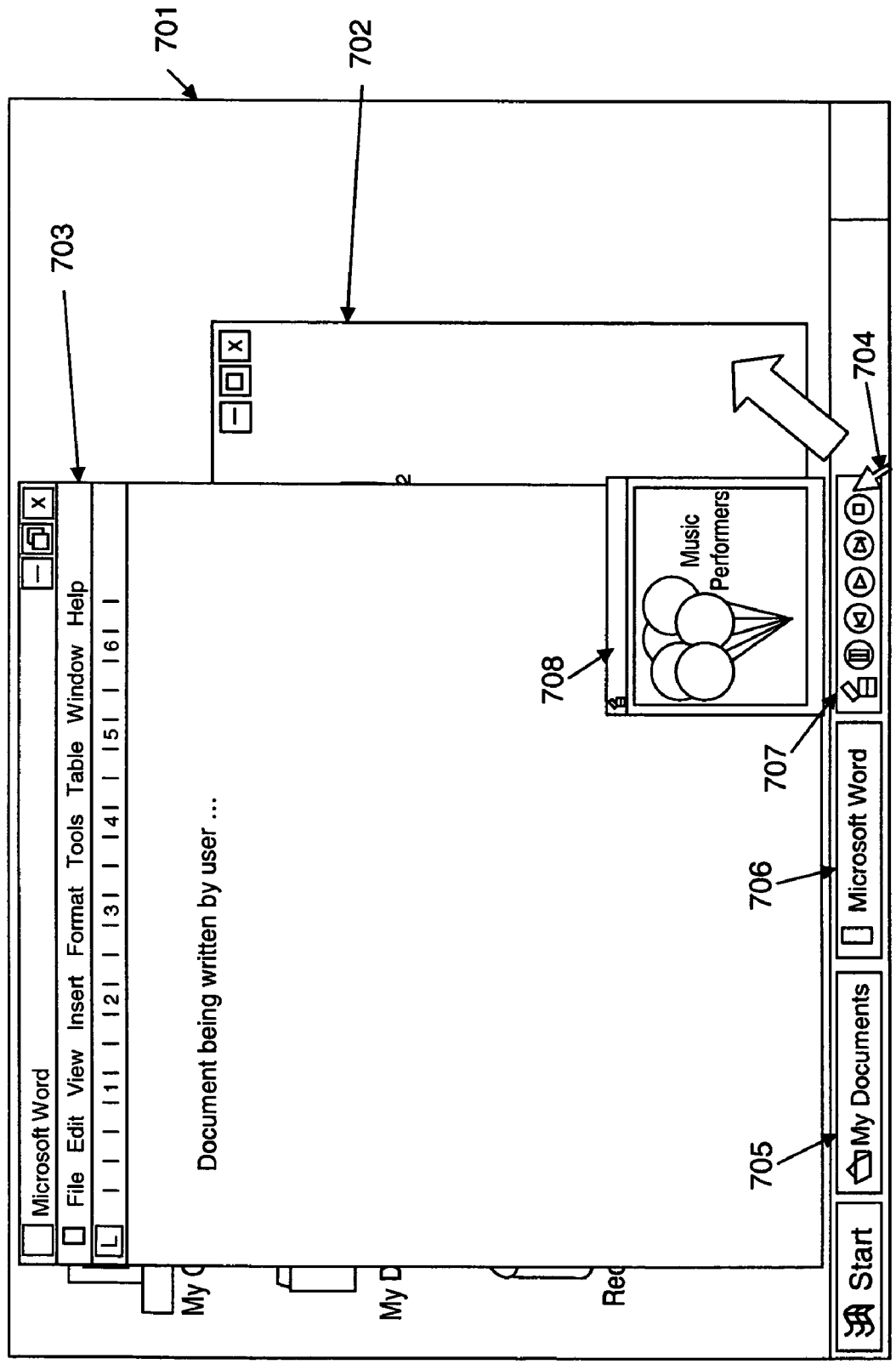
FIG. 7 illustrates an example of an aspect of the present invention in which a thumbnail is associated with an application and a rich presentation taskbar button.

Taskbar buttons may be associated with a thumbnail display. FIG. 7 illustrates display of a thumbnail associated with an application and a rich presentation taskbar button of the present invention. As FIG. 7 illustrates, a display 701 displays open windows. A window for a folder (e.g., "My Documents" window 702) is displayed on the display 701 and is associated with a corresponding simple taskbar button 705. A word processing application window 703 is also displayed on the display 701 and is also associated with a corresponding simple taskbar button 706. A media player application has been minimized so that the media player application window is not present on the display 701. However, the corresponding rich presentation taskbar button 707 associated with the media player application is present in the taskbar of the display 701. The rich presentation taskbar button 707 in this example contains control display elements for the media player application (e.g., transport controls). In this example as illustrated in FIG. 7, the rich presentation taskbar button 707 corresponding to the media player application provides buttons that can be used to control the application, i.e., the playing of media.

A cursor 704 is hovered over a predetermined location on the rich presentation taskbar button 707 to cause the display of a thumbnail 708. The thumbnail 708 is associated with the media player application. In the example illustrated in FIG. 7, the predetermined location on the rich presentation taskbar button 707 is on a side of the rich presentation taskbar button 707. The thumbnail 708 in this example is a miniature version of the full media player application in this example. However, the present invention is not so limited. The thumbnail may contain any information associated with the application. In the case of a media player application, the corresponding thumbnail may display stream information, album art, a visualization, a video, etc.

The content of a thumbnail may vary based on the associated application. Also, the content may be specified or authored by an application and presented to the taskbar programming interface. If the content of the thumbnail is specified by the application, the application (e.g., the media player application), may specify the content of the corresponding thumbnail to the programming interface of the taskbar. Thus, the resulting thumbnail may provide enhanced information that may be customized to the specific application or may be tailored to the needs of the user.

Figure 8:
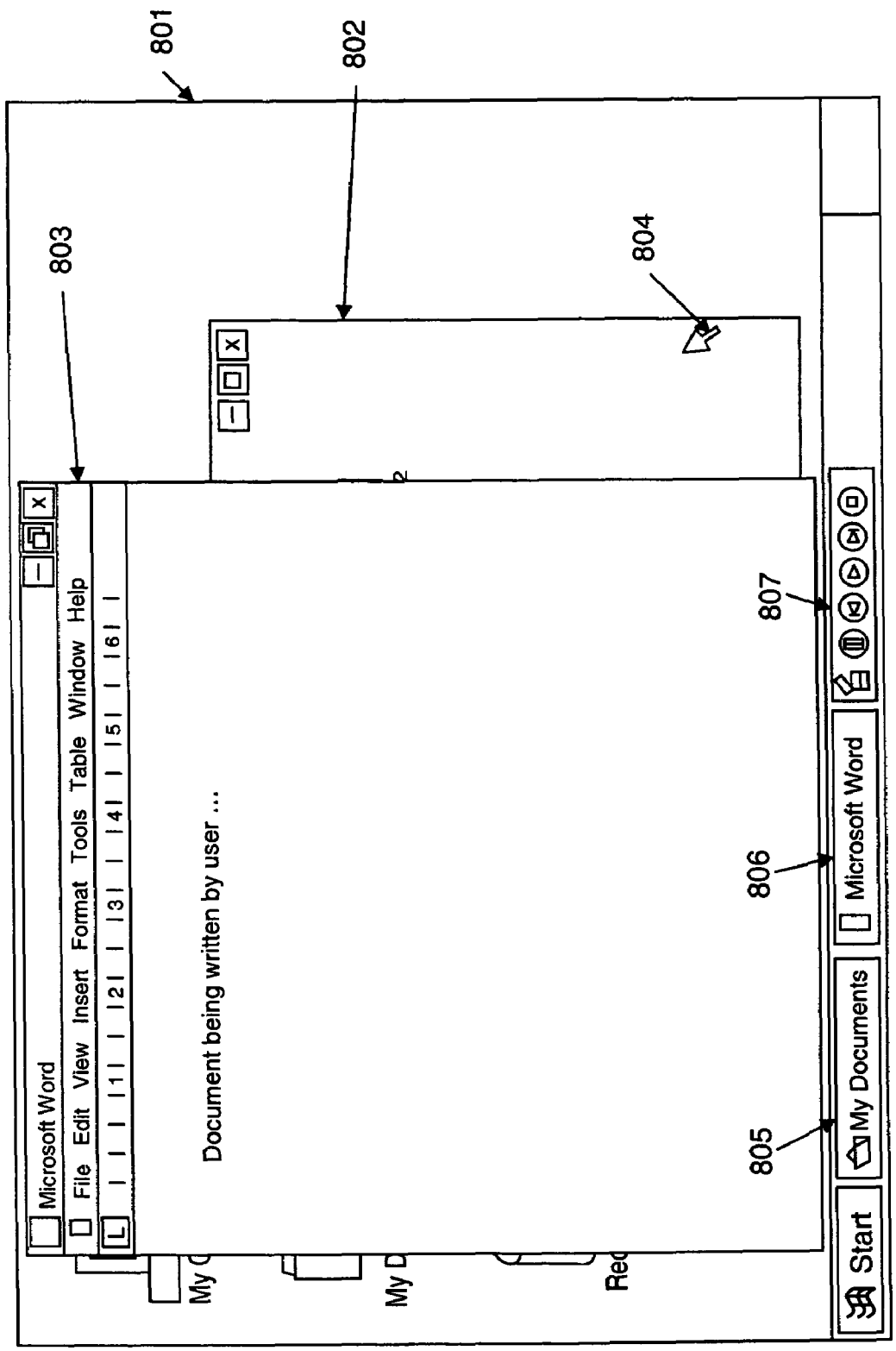
FIG. 8 illustrates an example of an aspect of the present invention in which a thumbnail is dismissed.

FIG. 8 illustrates dismissal of the thumbnail. As FIG. 8 illustrates, a display 801 contains open windows. A folder window (e.g., "My Documents" window 802 in this example) is present on the display 801 and is associated with a corresponding simple taskbar button 805. The "My Documents" window 802 is partially obscured by a word processing application window 803. The word processing application window 803 is also associated with a simple taskbar button 806. As in the example of FIG. 7, a media player application window is not displayed because the media player application window is either minimized or is displayed behind other display elements. For example, the media player application window may be completely obscured by the word processing application window 803. However, a rich presentation taskbar button 807 associated with the media player application provides control display elements. In this example, the rich presentation taskbar button 807 provides transport controls such that a user may control the operation of the media player application by selecting corresponding control display elements in the rich presentation taskbar button. Thus, through the interactive control display elements in the rich presentation taskbar button 807 of this example, a user may control the media player application without having to open the full media player application window on the display 801.

The cursor 804 is moved away from the predetermined location on the rich presentation taskbar button 807, the predetermined location being the location which provides a thumbnail of the corresponding application if, for example, a cursor is hovered over the predetermined location. FIG. 8 illustrates that the thumbnail is dismissed after the cursor 804 is moved away from the predetermined location thus saving space on the display 801.

Figure 9:
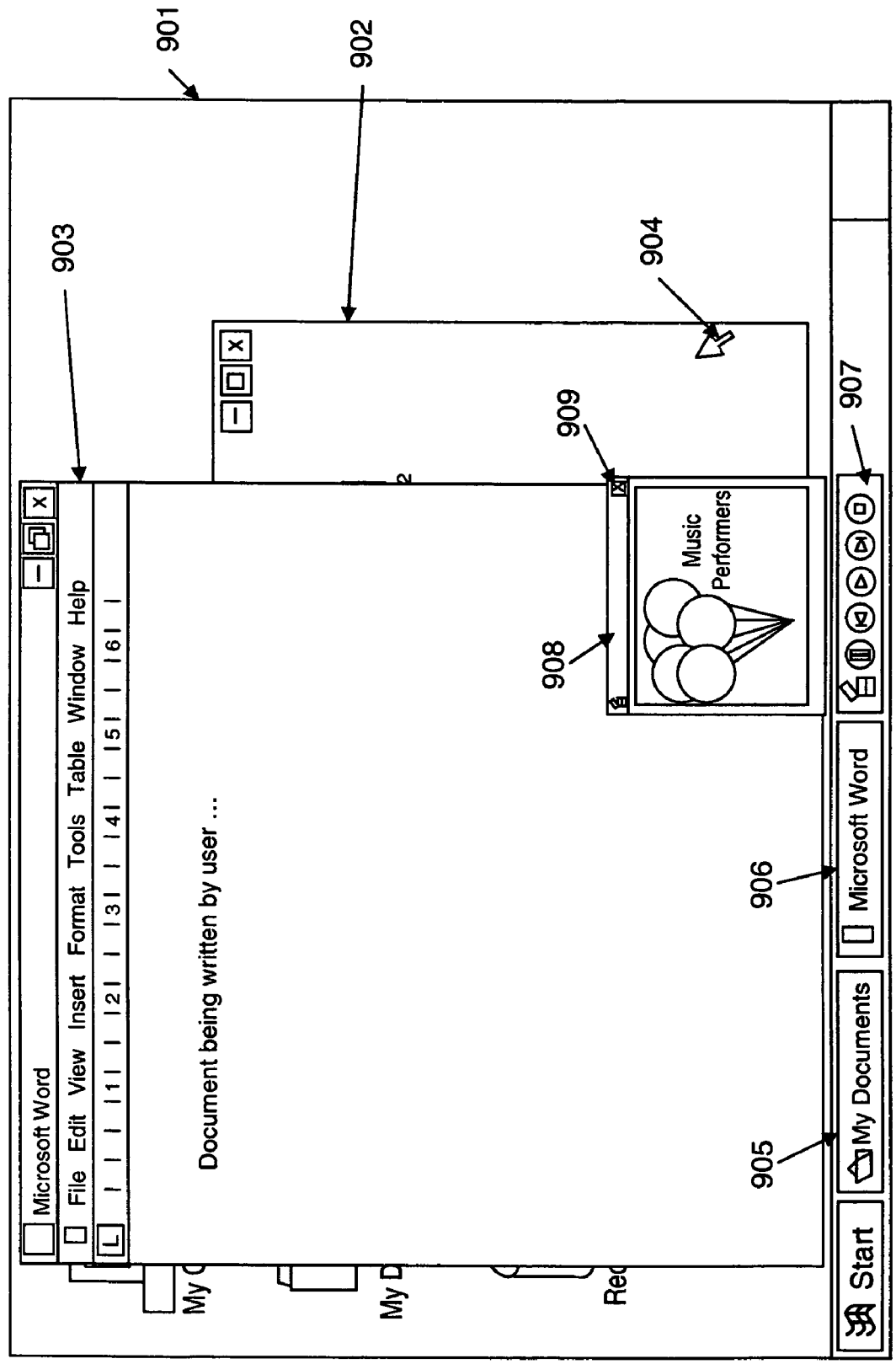
FIG. 9 illustrates an example of an aspect of the present invention in which a thumbnail is pinned on a display.

A user may wish a thumbnail to remain visible on the display even when a cursor is moved away from the predetermined area. FIG. 9 illustrates a method of pinning a thumbnail so that the thumbnail remains visible on a display even when the cursor is moved away from the predetermined location. FIG. 9 illustrates a display 901 containing open windows. A folder window (e.g., "My Documents" window 902) is displayed on the display 901 and is associated with a corresponding simple taskbar button 905. A word processing application window 903 is also displayed on the display 901 and partially obscures the "My Documents" window 902. The word processing application window 903 is associated with a simple taskbar button 906 present in the taskbar. As in the examples of FIGS. 7 and 8, a media player application window is not visible on the display 901 after having been either minimized or obscured by other display elements. However, a rich presentation taskbar button 907 associated with the media player application is displayed in the taskbar. The rich presentation taskbar button 907 contains interactive control display elements such that a user may control the operation or functionality of the media player application without having to take up space on the display 901 with an opened media player application window. As FIG. 9 illustrates, the rich presentation taskbar button 907 associated with the media player application contains transport controls as interactive control display elements.

As FIG. 9 illustrates, the cursor 904 has been moved away from the predetermined location on the rich presentation taskbar button 907 for opening the thumbnail 908. However, the thumbnail 908 remains open and visible on the display 901 because the thumbnail has been pinned open. Pinning the thumbnail may be accomplished by a variety of techniques. For example, the thumbnail may be pinned open by clicking on a designated icon or display element or by selecting an option on a menu. A menu may be invoked, for example, by pulling a menu down, by right-clicking, etc. The thumbnail may also be pinned open by default, if desired. When the thumbnail 908 is pinned open, the cursor may be moved to any location on the display without affecting the thumbnail 908, i.e., the thumbnail 908 remains open even when the cursor 904 is moved away from the taskbar button 907. When a thumbnail is pinned open, the user may continue to have access to additional information contained in the thumbnail even when the cursor is moved away from the predetermined location for opening the thumbnail. For example, a user may wish to view a video playing on the media player application while working on other projects on the computer. A thumbnail version of the video may play on the thumbnail that is pinned open on the display. The rich presentation taskbar button 907 provides the user with control of the operation of the media player application (and, hence, the playing/stopping/searching/etc. of the video) while also watching the video. At the same time, the user saves space on the display because a smaller version of the application is displayed as opposed to the full size window.

FIG. 9 also illustrates a method of dismissing a thumbnail that is pinned open. The thumbnail may contain a close button 909. A cursor 904 may be moved over the close button 909 of the thumbnail 908 to close the thumbnail 908. For example, the close button 909 may be selected or clicked to close the thumbnail 908.

Figure 10:
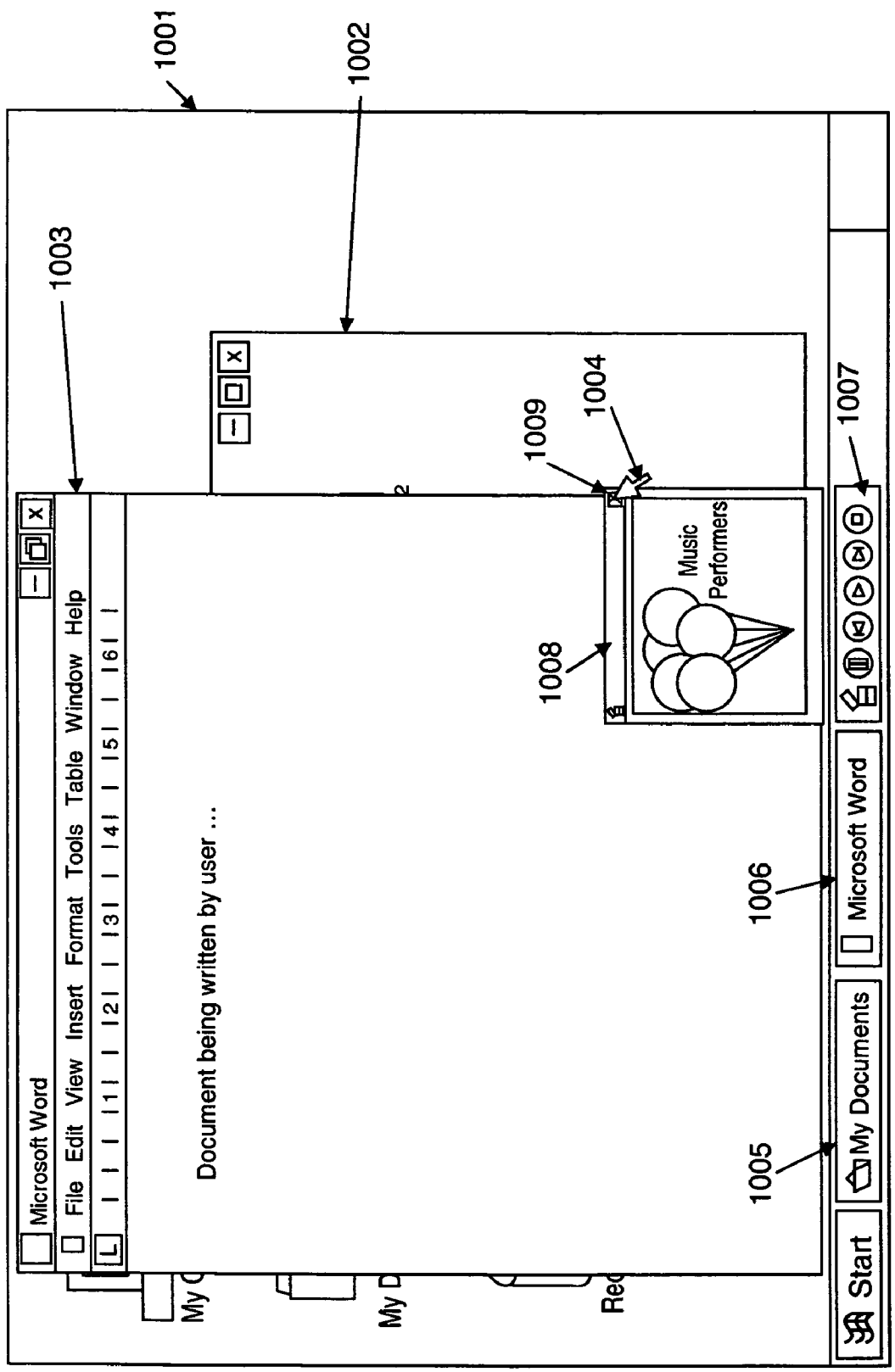
FIG. 10 illustrates an example of an aspect of the present invention in which a thumbnail that is pinned open is closed or dismissed.

FIG. 10 illustrates closing a thumbnail that has been pinned open. As FIG. 10 illustrates, a display 1001 contains open windows. A folder window (e.g., "My Documents" window 1002) is displayed with a corresponding simple taskbar button 1005. A word processing window 1003 is displayed and partially obscures the "My Documents" window 1002. The word processing window 1003 is associated with a simple taskbar button 1006 in the taskbar. As in the examples of FIGS. 7 and 8, a media player application window is not present on the display 1001 because the window has been minimized. The media player application window is associated with a corresponding rich presentation taskbar button 1007 that contains control display elements that enable a user to control the operation of the media player application by selecting controls in the rich presentation taskbar button 1007. In this example, the control display elements in the taskbar button 1007 provide transport controls. Thus, through the control display elements, a user may control the operation of the media player application without having to take up extra space on the display 1001 by opening the media player application window. A thumbnail 1008 corresponding to the media player application is displayed and is pinned open. Thus, although the cursor 1004 has been moved away from the predetermined location in the taskbar button 1007, the thumbnail 1008 remains displayed on the display 1001.

A cursor 1004 is used in this example to select a close button 1009. When the close button 1009 is selected (e.g., clicked), the thumbnail is closed and is no longer visible on the display 1001.

Figure 11:
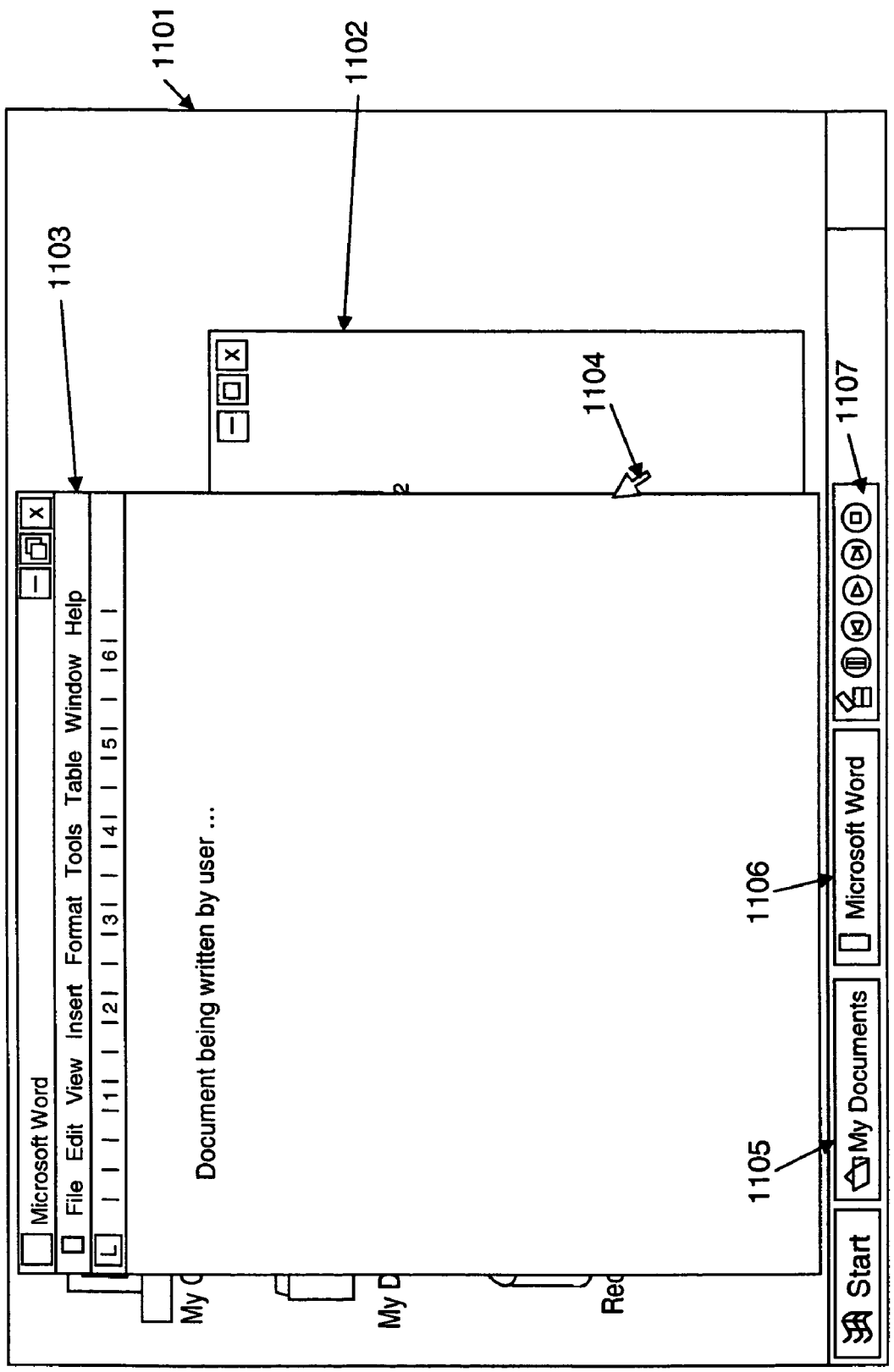
FIG. 11 illustrates an example of an aspect of the present invention in which a thumbnail is closed or dismissed.

FIG. 11 illustrates the example of FIG. 10 after the thumbnail has been closed or dismissed. As in the previous examples, FIG. 11 illustrates a display 1101 containing a folder window (e.g., "My Documents" window 1102) and a word processing application window 1103 that partially obscures the "My documents" window 1102. Both the "My Documents" window 1102 and the word processing application window 1103 are associated with a simple taskbar button (1105 and 1106, respectively). The thumbnail (not shown) corresponding to the media player application has been dismissed or closed by the cursor 1104 by selection of the close box of the thumbnail (not shown). In this example, closing of the thumbnail does not affect the corresponding rich presentation taskbar button 1107 which displays control display elements for controlling the operation of the media player application (e.g., transport controls).

Figure 12:
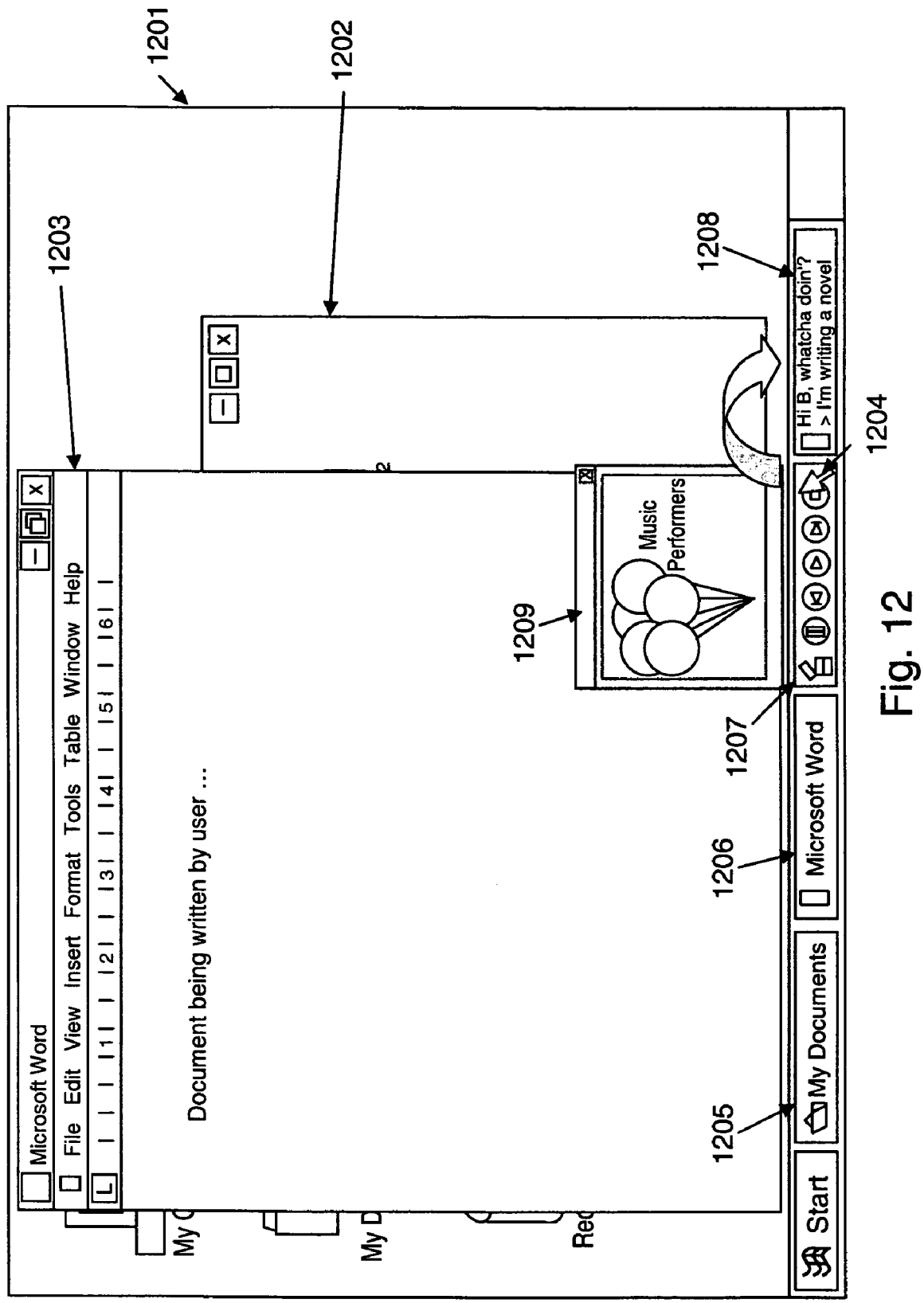
FIG. 12 illustrates an example of an aspect of the present invention in which multiple thumbnails are displayed in succession.

In addition, thumbnails from multiple taskbar buttons may be displayed. FIG. 12 illustrates a display 1201 containing a folder window ("My Documents" window 1202) that is partially obscured by a word processing application window 1203. The "My Documents" window 1202 and the word processing application window 1203 are associated with simple taskbar buttons (1205 and 1206, respectively). In the example illustrated in FIG. 12, a media player application window and an instant messaging application window have been minimized and are therefore not displayed on the display 1201, however each application has an associated taskbar button (1207 and 1208, respectively) in the taskbar. The media player application is associated with a rich presentation taskbar button 1207 that provides interactive control display elements that provide control of the media player application. By selecting (e.g., clicking) an interactive control display element in the rich presentation taskbar button 1207, a user may control the operation or functionality of the media player application itself. Likewise, the instant messaging application is associated with a rich presentation taskbar button 1208. The rich presentation taskbar button 1208 provides interactive control display elements that permit a user to enter text and to send entered text via instant messaging through the rich presentation taskbar button 1208. Also, a user is provided with dynamic information (i.e., information that is updated) that is periodically changed as events occur. In this case, a conversation thread of a conversation via instant messaging is updated to include the latest messages sent by a user.

A cursor 1204 is hovered over the rich presentation taskbar button 1207 for the media player application such that a thumbnail 1209 for the media player application appears on the display 1201. The thumbnail may include any variety of information associated with the media player application. For example, the thumbnail may include a miniature version of a video that is playing on the application, the name of a musical artist who is performing, a visual associated with the music or media playing, or any other pertinent information. The cursor may be moved away from the rich presentation taskbar button 1207 as indicated by the arrow in FIG. 12.

Figure 13:
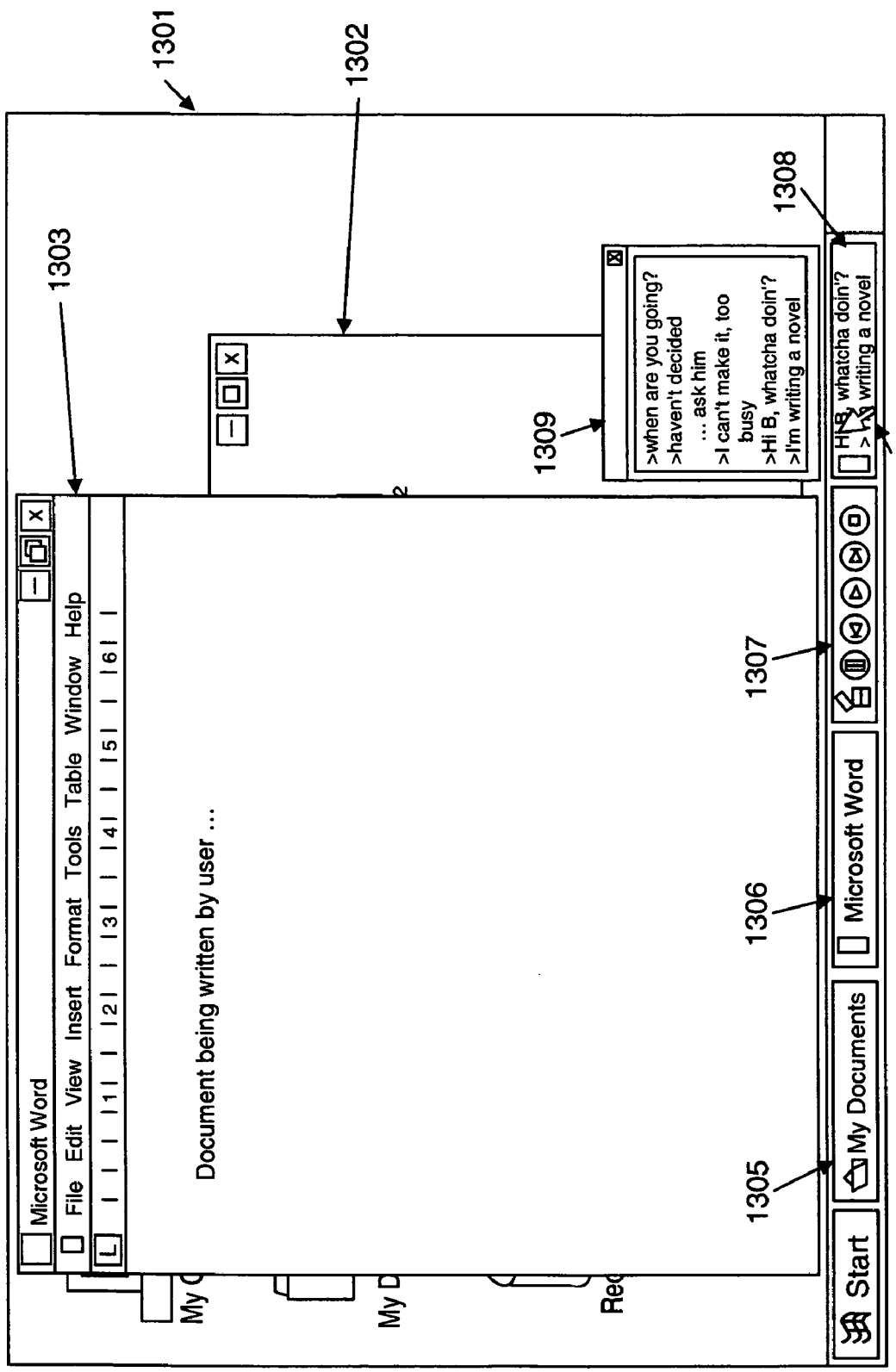
FIG. 13 illustrates an example of an aspect of the present invention in which a cursor hovers over a taskbar button and causes the display of a thumbnail and dismissal of another thumbnail.

FIG. 13 illustrates the example illustrated in FIG. 12 after the cursor has been moved away from the rich presentation taskbar button 1207. In the example of FIG. 13, a display 1301 contains a folder window (e.g., "My Documents" window 1302) and a word processing application window 1303. The "My Documents" window 1302 has an associated simple taskbar button 1305 and the word processing application window 1303 has an associated simple taskbar button 1306. In addition, a media player application has an associated rich presentation taskbar button 1307 in the taskbar and an instant messaging application has a corresponding rich presentation taskbar button 1308. As FIG. 13 illustrates, the rich presentation taskbar buttons of the media player application and the instant messaging application each contain control display elements for controlling the operation of the corresponding application via selecting controls in the corresponding rich presentation taskbar button. The rich presentation taskbar button 1308 of the instant messaging application also contains dynamic information (i.e., information that is changed and updated periodically). In the example of FIG. 13, the media player application contains control buttons (control display elements) including transport controls such as "play", "fast forward", etc. and the rich presentation taskbar button 1308 for the instant messaging application contains a portion of a conversation thread.

The cursor 1304 has been moved away from the rich presentation taskbar button 1307 associated with the media player application. Therefore, the thumbnail associated with the media player application has been dismissed and is no longer visible on the display 1301. However, the cursor 1304 has been moved to the rich presentation taskbar button 1308 corresponding to an instant messaging application such that a thumbnail 1309 for the instant messaging application is displayed.

Figure 14:
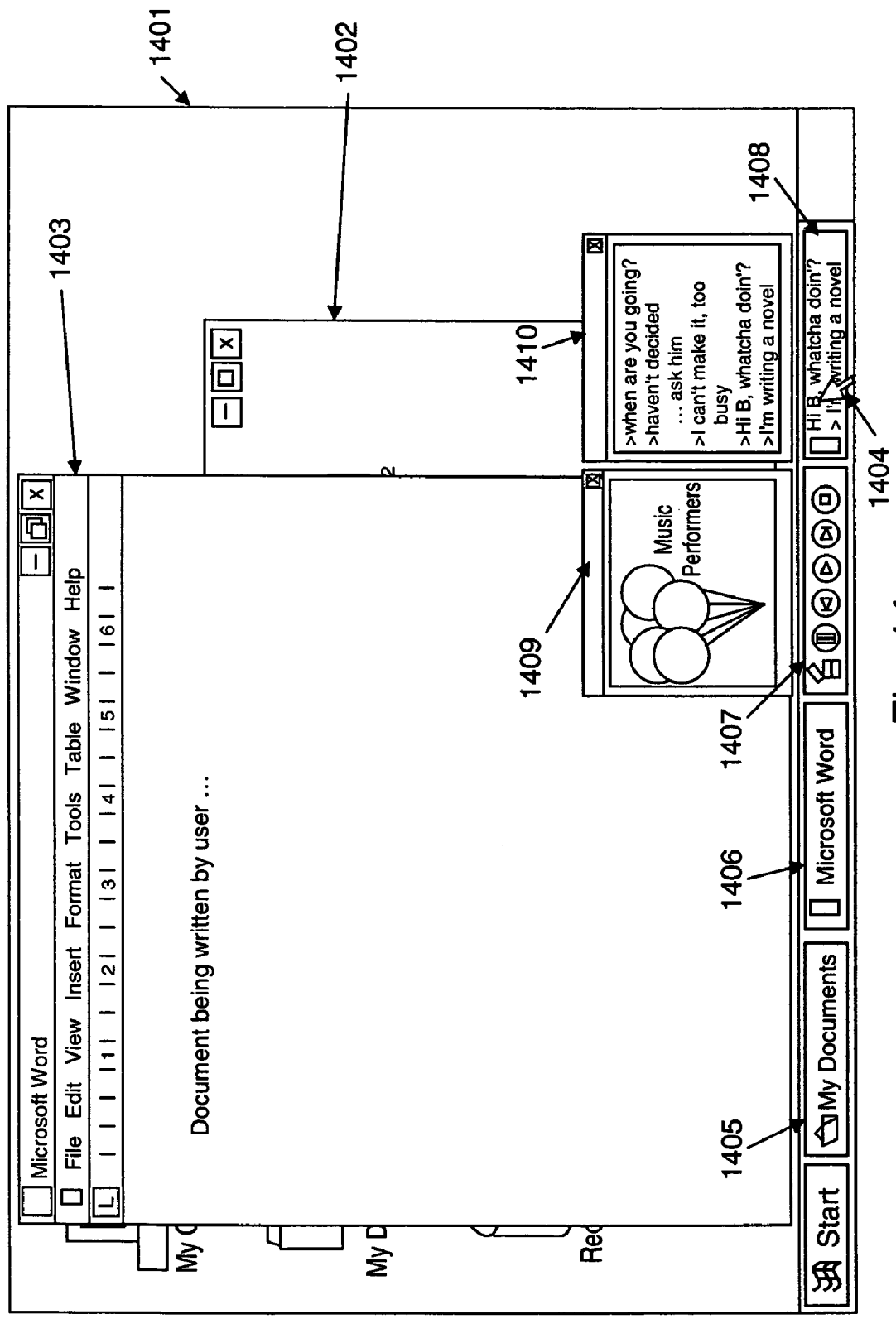
FIG. 14 illustrates an example of an aspect of the present invention in which multiple thumbnails are displayed simultaneously.

Also multiple thumbnails may be displayed simultaneously. For example, thumbnails may be pinned such that the thumbnails may remain displayed even after a cursor is moved away from a corresponding taskbar button. FIG. 14 illustrates a display 1401 containing a folder window (e.g., "My Documents" window 1402) and an overlapping word processing application window 1403. In addition, a media player application and an instant messaging application are active but minimized. There is a taskbar button displayed that corresponds to each of the applications. For example, the "My Documents" window 1402 is associated with simple taskbar button 1405, the word processing application window 1403 is associated with a simple taskbar button 1408, the media player application is associated with an rich presentation taskbar button 1407 and the instant messaging application is associated with a rich presentation taskbar button 1408.

FIG. 14 illustrates a thumbnail 1409 for the media player application pinned on the display 1401. The cursor 1404 hovers over the rich presentation taskbar button 1408 associated with the instant messaging application such that a thumbnail 1410 associated with the instant messaging application is displayed on the display 1401. Likewise, the thumbnail 1410 associated with the instant messaging application may also be pinned so that it remains displayed even if the cursor 1404 is moved away from the corresponding taskbar button 1408 associated with the instant messaging application. In the example illustrated in FIG. 14, both the thumbnail for the media player application and the instant messaging application are open and displayed on the display 1401.

Figure 15:
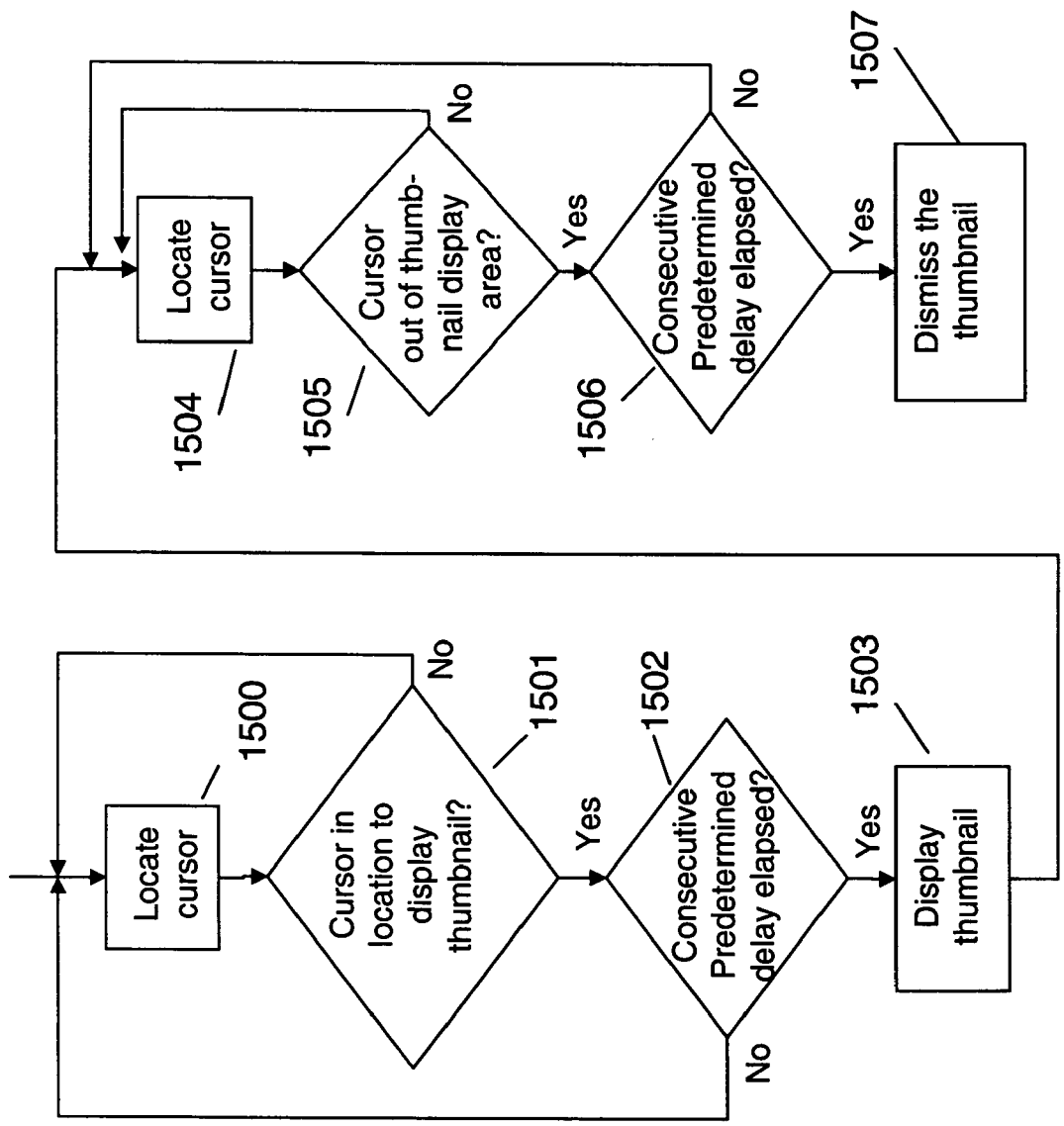
FIG. 15 is a flowchart of an exemplary method of displaying and dismissing thumbnails.

When thumbnails are displayed and dismissed, there may be a possibility of accidental or premature dismissal of a thumbnail or display of a thumbnail. FIG. 15 illustrates an example of a method for preventing premature or accidental displaying of a thumbnail or dismissal of a thumbnail. A cursor is located in step 1500 and is determined if the cursor has been moved over a predetermined location for which a thumbnail is to be invoked in step 1501. The predetermined location may be located anywhere on the display and is preferably located on a corresponding taskbar button. If the cursor is in the proper location (the "YES" branch of step 1501), it is further determined if a predetermined delay has elapsed while the cursor is in the proper location. The delay period may be set based on user preference or the individual circumstances. If insufficient time has elapsed after the cursor is positioned in the location to open a thumbnail, the system waits until either the delay period has elapsed (the "YES" branch of step 1502) signifying that the thumbnail should be displayed (step 1503) or the cursor is again moved away from the location (signifying that the thumbnail should not be displayed). If the cursor has been located in the location for displaying the thumbnail for the predetermined period of time, the thumbnail is displayed (step 1503).

FIG. 15 also illustrates an example of a method for preventing accidental or premature dismissal of a thumbnail. After a thumbnail is displayed, a cursor is located (step 1504) and determined if the cursor has been moved away from the location for which a thumbnail is invoked (step 1505). If the cursor remains at the location to invoke the thumbnail (the "NO" branch of step 1505), the thumbnail remains displayed. If the cursor is moved away from the location to invoke the thumbnail, it is first determined if a predetermined delay period of time has elapsed while the cursor is away from the location that invokes the thumbnail. This delay period may be set according to the preferences or needs of the individual user in a specific circumstance, for example. If insufficient time has elapsed with the cursor being away from the location to invoke the thumbnail, then the system waits until the cursor has remained away from the location to invoke the thumbnail for the designated length of time (the "YES" branch of step 1506) indicating that the thumbnail should be dismissed. Alternatively, the system waits until the cursor is moved back onto the location for which a thumbnail is invoked before the delay period has elapsed indicating that the thumbnail should remain displayed (the "NO" branch of step 1506). If the cursor is moved away from the location to invoke the thumbnail for a length of time at least a long as the designated delay, then the thumbnail is dismissed (step 1507).

Figure 16:
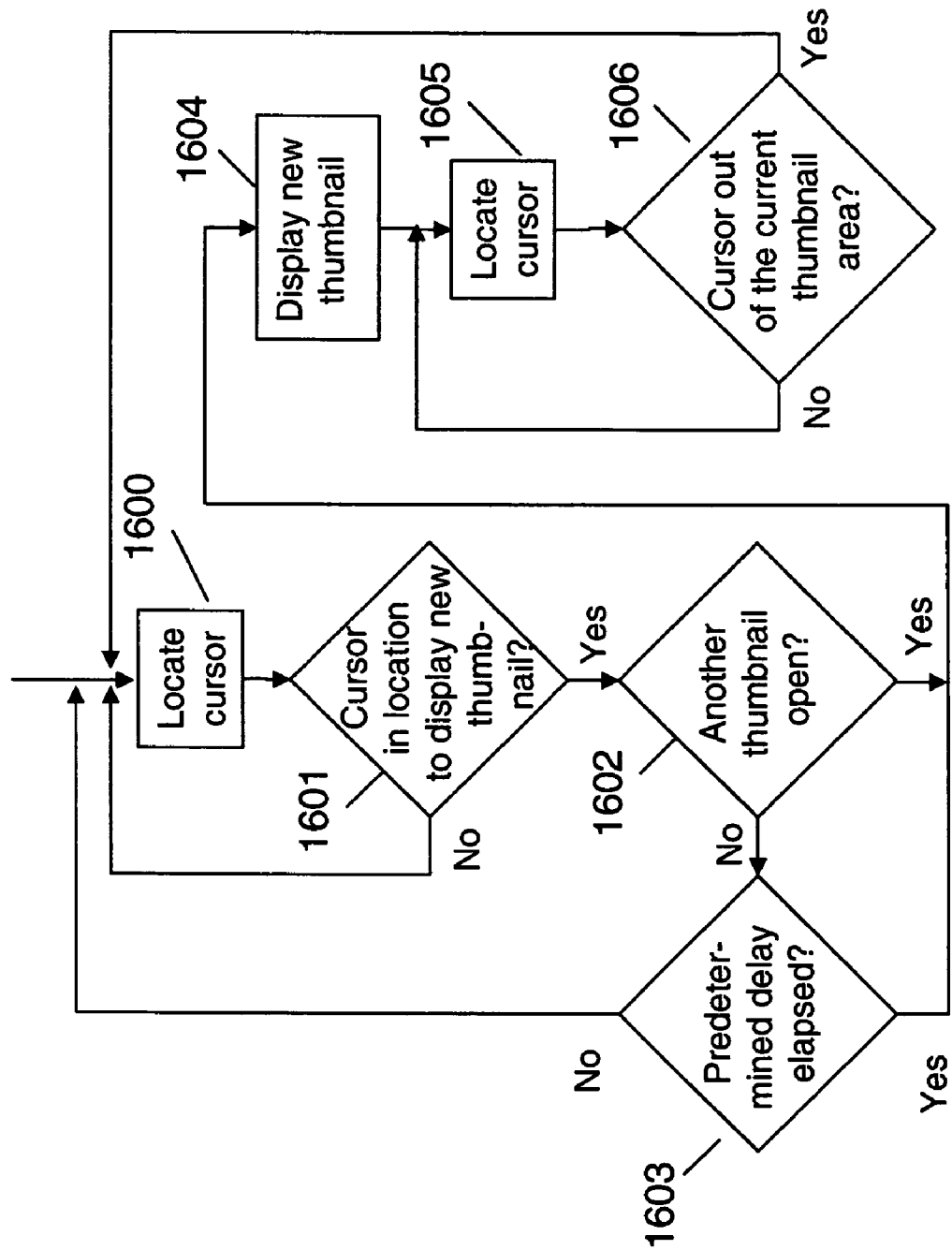
FIG. 16 is a flowchart of another exemplary method of delaying the display of a thumbnail with more than one thumbnail being displayed.

FIG. 16 illustrates another example of a method for delaying display of a thumbnail. In this example, there is a delay in displaying a thumbnail to prevent premature, undesired or inadvertent display of the thumbnail if it is the first thumbnail to be displayed but there would be no delay if there were other thumbnails displayed. This enables a user to rapidly scan the thumbnails of a series of applications and their taskbar buttons. In this example, a cursor may be located (step 1600) in a location for invoking a thumbnail (Step 1601). For example, the cursor may be moved onto a predetermined location on a taskbar button. If there are no other thumbnails currently being displayed (the "NO" branch of step 1602), then it is determined if a predetermined period of delay has elapsed (step 1603). This period of time may be set according to user preferences or needs in a particular circumstance, for example. Once the cursor remains at the location for invoking the thumbnail for a sufficient length of time (the "YES" branch of step 1603), the thumbnail is displayed (step 1604). Alternatively, if there is at least one other thumbnail already displayed on the display when the cursor is moved to the location to invoke another thumbnail (the "YES" branch of step 1602), then the thumbnail is displayed without waiting for a predetermined period of delay (the "YES" branch of step 1602 and step 1604). In the example of FIG. 16, after the thumbnail is displayed, the cursor is located (step 1605) such that the thumbnail may be dismissed when the cursor is moved away from the location to invoke the thumbnail ("YES" branch of step 1606) (e.g., the corresponding taskbar button).

Figure 17:
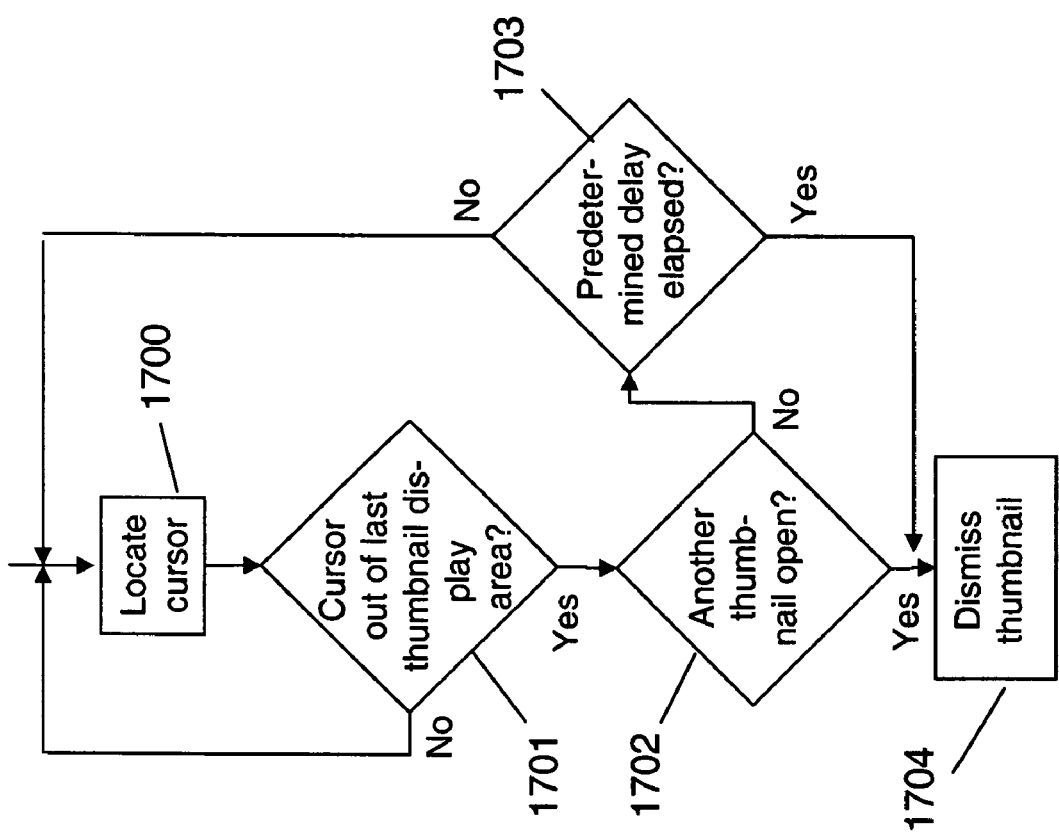
FIG. 17 is a flowchart of a method of dismissing thumbnails.

FIG. 17 illustrates another example of dismissing thumbnails. In this example, a thumbnail is already displayed with a cursor in a location to display the thumbnail (e.g., in a taskbar button). The cursor is located in step 1700. If the cursor is moved away from the location (e.g., the taskbar button) (the "YES" branch of step 1701), it is first determined if there is at least one other thumbnail displayed (step 1702). If there are no other thumbnails displayed (the "NO" branch of step 1702) (i.e., the present thumbnail is the last thumbnail being displayed), then the system waits until the cursor remains away from the location for a predetermined delay period of time before dismissing the thumbnail (the "YES" branch of step 1703). However, if there is another thumbnail open at the time the cursor is moved away from the location (the "YES" branch of step 1702), then the thumbnail is dismissed (step 1704) without delay. In this example, a delay occurs before the last thumbnail closes but not before closing any preceding thumbnail. This prevents accidental or premature closing of thumbnails while also providing a rapid response in the closing of thumbnails where needed.

Figure 18A:
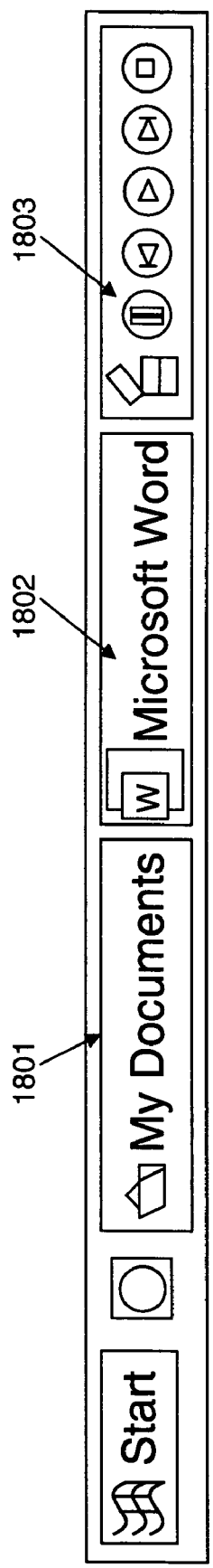
FIGS. 18A-18C illustrate examples of displaying rich presentation taskbar buttons with simple taskbar buttons.
Figure 18B:
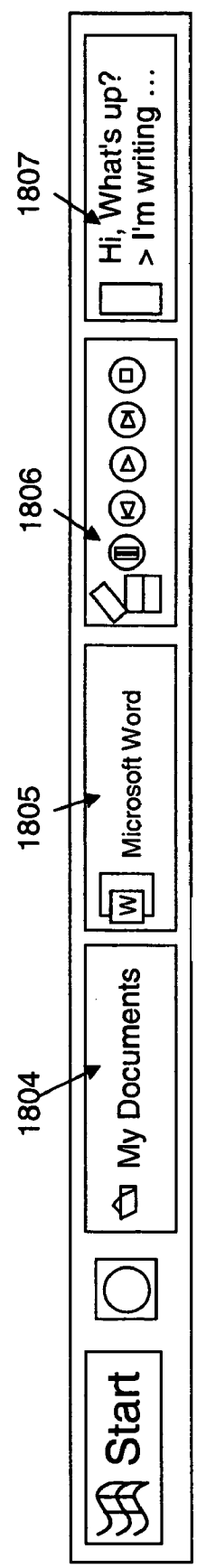
Figure 18C:
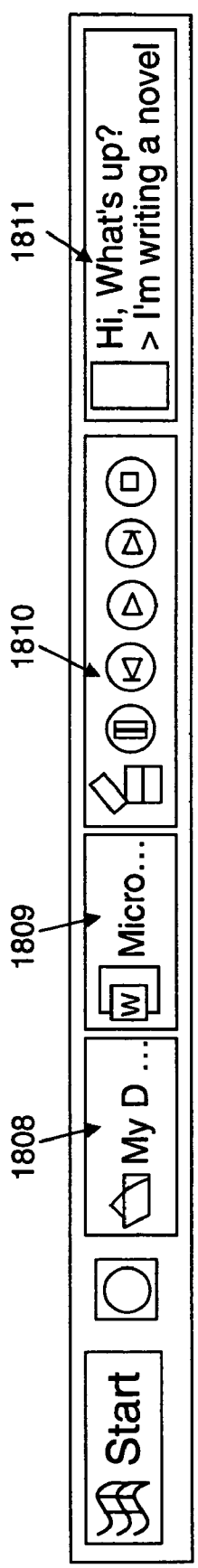

In another aspect of the present invention, the taskbar buttons may be scaled. For example, when a plurality of taskbar buttons are present in the taskbar, the taskbar buttons may change in size or content to accommodate all of the taskbar buttons with the amount of space available. FIGS. 18A-C illustrate examples of scaling the taskbar buttons based on size.

FIG. 18A illustrates an example of a taskbar containing three taskbar buttons, a folder taskbar button (e.g., "My Documents" taskbar button 1801) which is a simple taskbar button, a word processing application taskbar button 1802 which is also a simple taskbar button and a media player application taskbar button 1803 which is a rich presentation taskbar button. In this example, there is sufficient space on the taskbar to accommodate all three of the taskbar buttons. Therefore, each of the three taskbar buttons is full-size and approximately the same size as each of the other taskbar buttons.

FIG. 18B illustrates the taskbar buttons of FIG. 18A, namely, a folder taskbar button (e.g., "My Documents" taskbar button 1804) which is a simple taskbar button, a word processing application taskbar button 1085 which is a simple taskbar button and a media player application taskbar button 1086 which is a rich presentation taskbar button with the addition of an additional taskbar button 1807 (which is a rich presentation taskbar button) associated with an instant messaging application. To accommodate the additional rich presentation taskbar button 1807 in the amount of space available in the taskbar, each of the taskbar buttons decreases in size. In the example illustrated in FIG. 18B, each of the 4 resulting taskbar buttons are smaller than each of the taskbar buttons in the example of FIG. 18A but are approximately equal in size to each of the other taskbar buttons in the example of FIG. 18B. In this example, each of the taskbar buttons decreases in size equally such that rich presentation taskbar buttons decrease in size in the same proportion as simple taskbar buttons.

FIG. 18C illustrates another example of scaling of taskbar buttons. In this example, an additional rich presentation taskbar button 1811 is added to the pre-existing taskbar buttons in the taskbar. Namely, a folder taskbar button (e.g., "My Documents" taskbar button 1808) (a simple taskbar button), a word processing application taskbar button 1089 (a simple taskbar button) and a media player application taskbar button 1810 (rich presentation taskbar button) are already in the taskbar when an instant messaging application and its rich presentation taskbar button 1811 are activated. In this example, regular simple taskbar buttons decrease in size to allow space to accommodate the additional rich presentation taskbar button 1811 while other rich presentation taskbar buttons (e.g., taskbar button 1810) do not decrease in size. As FIG. 18C illustrates, the "My Documents" taskbar button 1808 and the word processing application taskbar button 1809, which are simple taskbar buttons, decrease in size but the media player taskbar button 1810, which is a rich presentation taskbar button, does not decrease in size. The additional rich presentation taskbar button 1811 in this example is associated with an instant messaging application and also contains a custom interface. Therefore, as FIG. 18C illustrates, the simple taskbar buttons (i.e., the "My Documents" taskbar button 1808 and the word processing application taskbar button 1809) are displayed in a smaller form and the rich presentation taskbar buttons (i.e., the media player taskbar button 1810 and the instant messaging application taskbar button 1811) are displayed at full size. In this example, the size of rich presentation taskbar buttons is maintained at the expense of the size of simple taskbar buttons.

As additional taskbar buttons are added to the taskbar of FIGS. 18A-C, it may become necessary to decrease the size of the rich presentation taskbar buttons. In this example (not illustrated), the size of simple taskbar buttons may be decreased to a particular minimum threshold before the size of rich presentation taskbar buttons is decreased. For example, the size of the simple taskbar buttons may be decreased in size to a point where useful information is no longer available in the taskbar button. One non-limiting example of a taskbar button too small to provide useful information would be a taskbar button that lacks sufficient space to provide even a name or logo that can identify the application associated with the taskbar button. Thus, in this example, the individual sizes of taskbar buttons are decreased according to a priority scheme. In one example, the priority scheme gives priority to rich presentation taskbar buttons such that rich presentation taskbar buttons retain their original size over simple taskbar buttons. After the size of simple taskbar buttons decreases to a point where any further decrease in size would degrade useful information from the simple taskbar button, the rich presentation taskbar buttons would then begin to decrease in size.

In another example (not illustrated), the size of rich presentation taskbar buttons would decrease either in proportion to all other taskbar buttons (i.e., simple taskbar buttons) or after the other simple taskbar buttons have decreased in size to a point where any further reduction in size would render the taskbar buttons uninformative, however, the rich presentation taskbar buttons would only decrease in size to a point where they would provide sufficient information or control capability. At that point, the rich presentation taskbar buttons would no longer decrease in size.

Figure 19A:
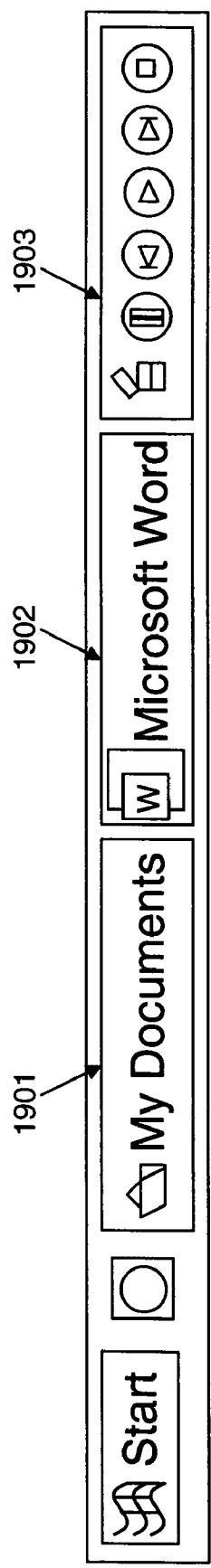
FIGS. 19A-19F illustrate another example of displaying rich presentation taskbar buttons with simple taskbar buttons.

In addition, taskbar buttons may merge together to save space in the taskbar, for example, through taskbar button consolidation. As used herein, the phrase "taskbar button consolidation" means multiple taskbar buttons being combined into a single taskbar button. When information from at least 2 taskbar buttons are placed into a single taskbar button, more space is available in the taskbar for other display items. Thus, particularly when additional space is needed in the taskbar, multiple taskbar buttons may be combined through taskbar button consolidation. FIGS. 19A-F illustrate examples of taskbar button consolidation. FIG. 19A illustrates an example of a taskbar containing three taskbar buttons. A folder taskbar button (e.g., "My Documents" taskbar button 1901) and a word processing application taskbar button 1902 are present in this example. Both the "My Documents" taskbar button 1901 and the word processing application taskbar button 1902 are simple taskbar buttons. A third taskbar button 1903 associated with a media player application is present in this application. The taskbar button 1903 associated with a media player application is a rich presentation taskbar button as illustrated in FIG. 19A. In this example, there is sufficient space on the taskbar to accommodate all three taskbar buttons. As a result, all three taskbar buttons are displayed individually and at full size.

Figure 19B:
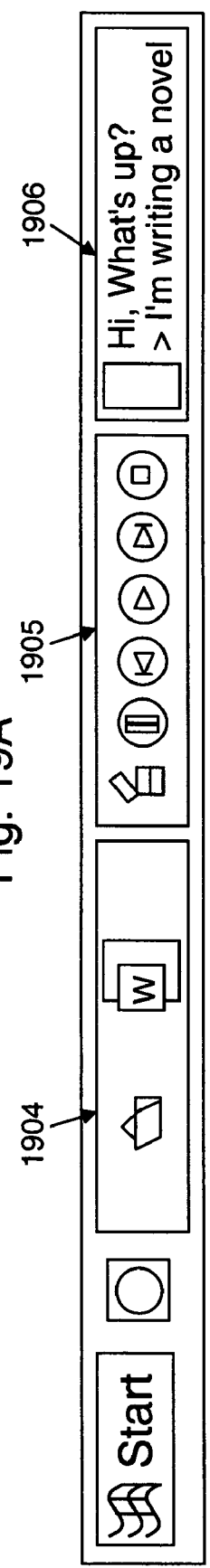

FIG. 19B illustrates another example of displaying taskbar buttons in a taskbar. The taskbar in FIG. 19B contains taskbar buttons for the three applications and windows represented in FIG. 19A, namely, a "My Documents" taskbar button, a word processing application taskbar button and a media player application taskbar button. However, in FIG. 19B, an additional rich presentation taskbar button 1906 is added to the taskbar. This added rich presentation taskbar button 1906 is associated with an instant messenger application in this example. Taskbar button consolidation may be performed to accommodate the addition of the rich presentation taskbar button 1906. In this example, the simple folder taskbar button ("My Documents" taskbar button 1901) as illustrated in FIG. 19A is consolidated with the word processing application taskbar button 1902 as illustrated in FIG. 19A to form a single taskbar button 1904 that incorporates the folder (e.g., "My Document") and the word processing application. Thus, there is adequate space on the taskbar to display the media player taskbar button 1905 (a rich presentation taskbar button) and the newly added instant messaging application taskbar button 1906 (a rich presentation taskbar button) individually and at full size. As illustrated in FIG. 19B, simple taskbar buttons are combined through taskbar button consolidation whereas rich presentation taskbar buttons are not combined through taskbar button consolidation. Alternatively, if additional rich presentation taskbar buttons are added to the taskbar (not illustrated), rich presentation taskbar buttons may be combined by taskbar button consolidation but only after simple taskbar buttons are already combined by taskbar button consolidation. In this way, rich presentation taskbar buttons are given priority such that rich presentation taskbar buttons are preserved until all simple taskbar buttons are already combined by taskbar button consolidation at which time the rich presentation taskbar buttons may be combined by taskbar button consolidation.

Figure 19C:
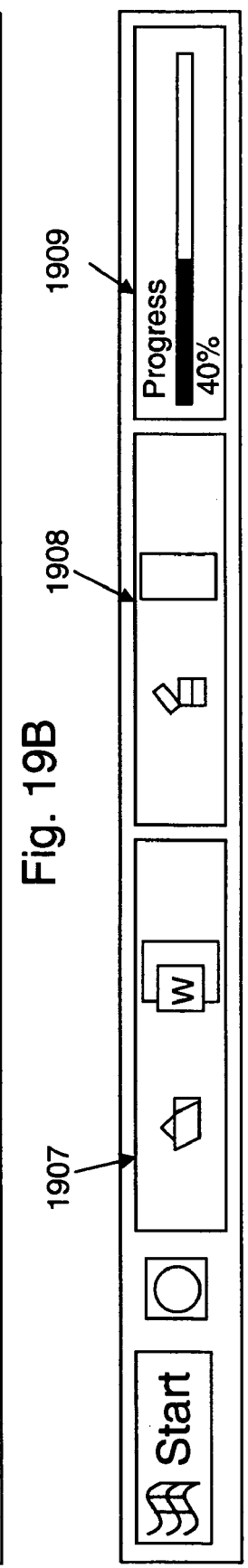

FIG. 19C illustrates another example of displaying taskbar buttons. In this example, an additional rich presentation taskbar button 1909 is added to the taskbar which already contains simple and/or rich presentation taskbar buttons. In this example, simple taskbar buttons are combined by taskbar button consolidation and rich presentation taskbar buttons are combined by taskbar button consolidation to provide adequate space on the taskbar to accommodate all taskbar buttons. As FIG. 19C illustrates, the simple taskbar button 1901 associated with a folder window (e.g., the "My Documents" window) as illustrated in FIG. 19A and the taskbar button 1902 associated with the word processing application as illustrated in FIG. 19A are combined by taskbar button consolidation to form a single taskbar button 1907 in FIG. 19C. Also, the rich presentation taskbar button 1905 for the media player application as illustrated in FIG. 19B and the rich presentation taskbar button 1906 associated with the instant messaging application as illustrated in FIG. 19B are combined by taskbar button consolidation to form a single taskbar button 1908 illustrated in FIG. 19C. Hence, simple taskbar buttons are combined by taskbar button consolidation or merged into one taskbar button (e.g., taskbar button 1907) and rich presentation taskbar buttons are combined by taskbar button consolidation or merged together as another taskbar button (e.g., taskbar button 1908) allowing space to add additional taskbar buttons 1909.

Figure 19D:
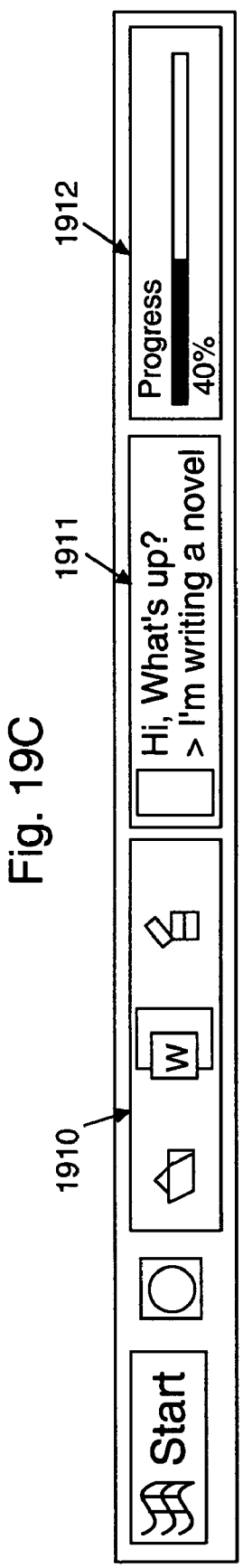

FIG. 19D illustrates another example of displaying taskbar buttons. In this example, rich presentation taskbar buttons are combined by taskbar button consolidation with simple taskbar buttons. As FIG. 19D illustrates, an additional rich presentation taskbar button 1912 for another application is added to the taskbar. To allow space on the taskbar to accommodate all taskbar buttons, the taskbar buttons are combined by taskbar button consolidation regardless of whether the taskbar buttons are simple or rich presentation taskbar buttons. For example, as illustrated in FIG. 19D, a rich presentation taskbar button 1912 is added to the taskbar. The simple folder taskbar button (e.g., "My Documents" taskbar button 1901 as illustrated in FIG. 19A) is combined by taskbar button consolidation with the simple word processing application taskbar button 1902 of FIG. 19A. In addition, the rich presentation taskbar button 1905 associated with the media player application of FIG. 19B is combined by taskbar button consolidation with the "My Documents" taskbar button 1901 and the word processing application taskbar button 1902 to form a single taskbar button 1910 that incorporates the "My Documents" taskbar button, the word processing application taskbar button and the media player rich presentation taskbar button (FIG. 19D). As in the earlier examples, the "My Documents" taskbar button and the word processing application taskbar button in this example are simple taskbar buttons whereas the media player taskbar button is a rich presentation taskbar button. In this example, taskbar buttons are combined by taskbar button consolidation without regard as to whether the individual taskbar buttons are simple or rich presentation.

Figure 19E:
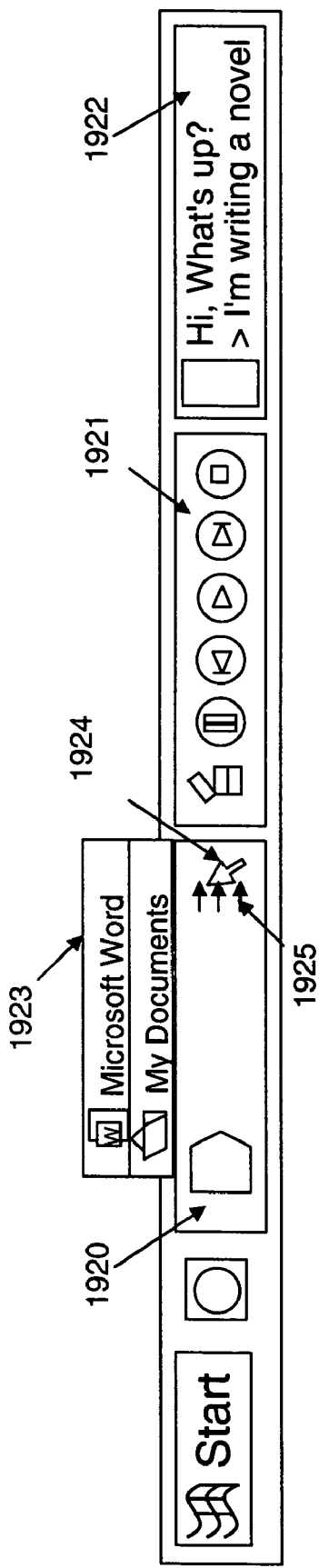

FIG. 19E illustrates another example of taskbar button consolidation in which the taskbar buttons associated with more than one application are combined into a single taskbar button and is displayed in a menu. As FIG. 19E illustrates, a rich presentation taskbar button 1921 associated with a Media Player application contains control display elements and is present in the taskbar. Also, another rich presentation taskbar button 1922 is present in the taskbar associated with an Instant Messaging application. Taskbar 1920 is a single taskbar button that represents multiple applications. In this example, taskbar button 1920 represents a word processing application and a folder (e.g., a "My Documents" folder). A cursor 1924 activates a menu 1923. As in the example of FIG. 19C, simple taskbar buttons are consolidated but rich presentation taskbar buttons are not merged or consolidated with simple taskbar buttons. Rather, only simple taskbar buttons are consolidated. In this example the activation of the menu 1923 is represented by arrows 1925 in the consolidated taskbar button 1920. Thus, the user may cause the display of a menu of all applications that are included in the consolidated taskbar button.

Figure 19F:
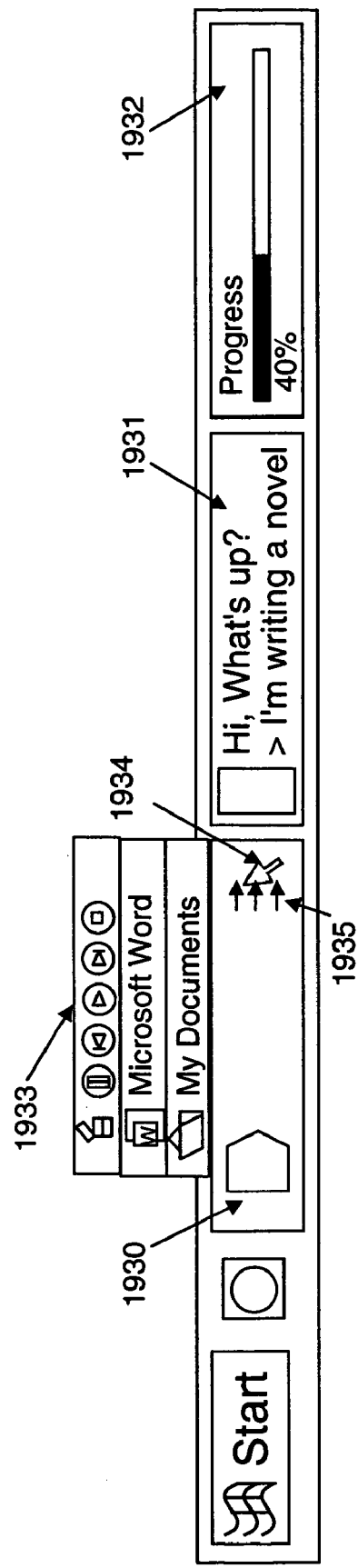

FIG. 19F illustrates another example of taskbar consolidation. In this example, an additional rich presentation taskbar button 1932 is added to the taskbar and rich presentation taskbar buttons may be combined with any other type of taskbar button, such as simple taskbar buttons. Therefore, in this example, an rich presentation taskbar button associated with a Media Player application is combined or consolidated with "simple" taskbar buttons to form a single consolidated taskbar button 1930. As in the previous example, a cursor 1934 may be used to display a menu 1933 of applications included in the consolidated taskbar button 1930. In this example, a folder, a word processing application and a media player application are included in the consolidated taskbar button 1930 and are displayed in the menu 1933 that appears after activation by the cursor 1934. As a non-limiting example, the display of the menu 1933 of applications included in the taskbar button 1930 may be an icon or predetermined area in the taskbar button 1930. In this example, the predetermined area is represented by arrows 1935.

Figure 20A:
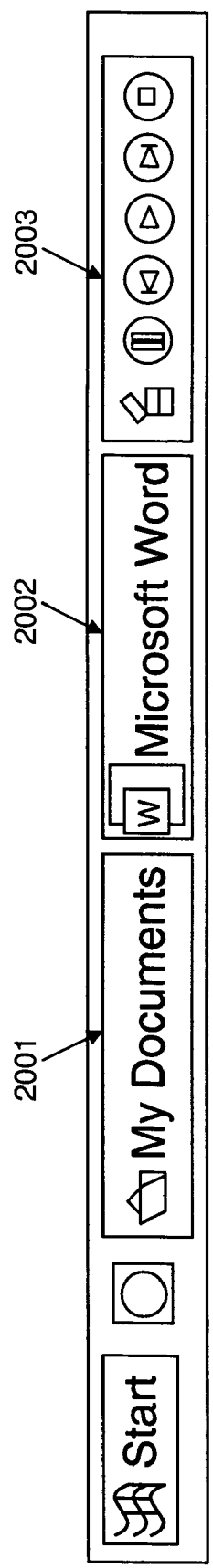
Figure 20B:
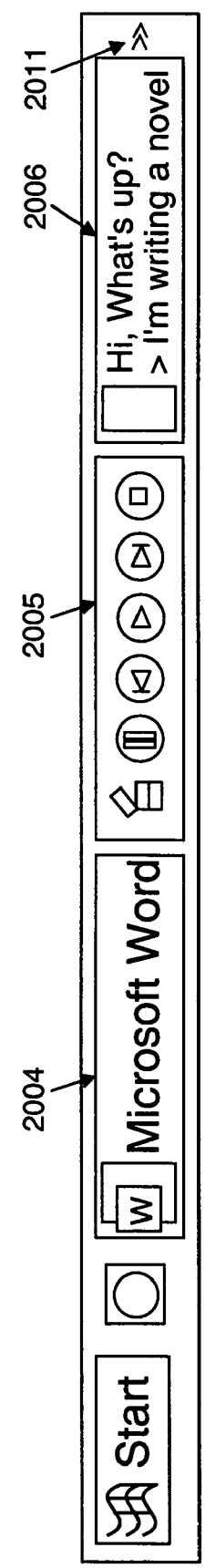
Figure 20C:
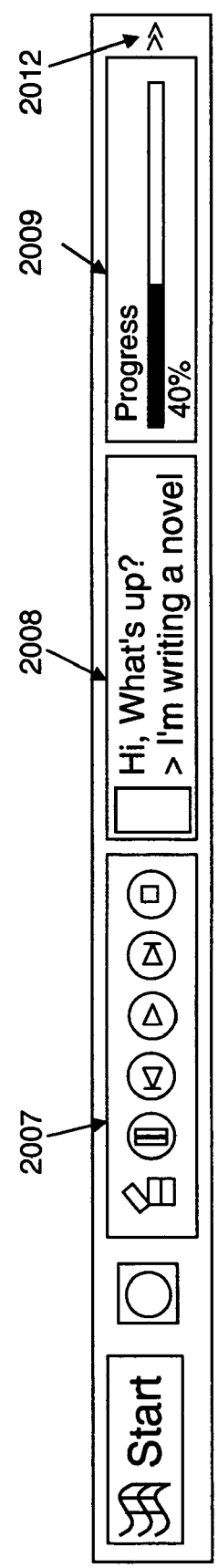

Alternatively, taskbar buttons may be placed on an overflow menu to allow space on the taskbar to accommodate the taskbar buttons. FIGS. 20A-C illustrate examples of taskbar buttons being placed in overflow. FIG. 20A illustrates a taskbar containing three taskbar buttons—a "My Documents" taskbar button 2001, a word processing application taskbar button 2002 and a media player taskbar button 2003. As in the previous examples, the "My Documents" taskbar button 2001 and the word processing application taskbar button 2002 are simple taskbar buttons and the media player taskbar button 2003 is a rich presentation taskbar button.

FIG. 20B illustrates an example of a taskbar button being added to the taskbar. The taskbar buttons, such as the simple word processing application taskbar button 2004 and the media player taskbar button 2005 remain displayed in the taskbar individually and at full-size along with the newly added rich presentation taskbar button 2006 that is associated with an instant messaging application in this example. To make room on the taskbar for all of the taskbar buttons, the "My Documents" taskbar button (2001 in FIG. 20A) is placed in overflow as indicated by the arrows 2010.

FIG. 20D illustrates the display of applications in overflow. In this example, a cursor 2017 is activated over a predetermined area to cause the display of a menu containing applications that are present in overflow. As FIG. 20D illustrates, a rich presentation taskbar button 2015 is added to the taskbar that already contains other taskbar buttons. To make room for the new rich presentation taskbar button, taskbar buttons may be placed in overflow in a desired priority. For example, simple taskbar buttons may be placed in overflow prior to placing rich presentation taskbar buttons in overflow. Thus, in this example, the taskbar button associated with the "My Documents" folder is first placed into overflow after a rich presentation taskbar button is added to the taskbar necessitating moving another application out of the taskbar. The cursor 2017 is activated over a predetermined area 2016 (represented by arrows in FIG. 20D) causing the display of a menu of applications 2018 that are in overflow. In this example, there is a folder in overflow as demonstrated by the listing of "My Documents" on the menu of applications 2018.

FIG. 20E illustrates another example of placing simple taskbar buttons in overflow. In this example, another rich presentation taskbar button 2021 is added to the taskbar. Because there is insufficient room in the taskbar to display all taskbar buttons, another simple taskbar button is placed into overflow. The overflow menu 2023 may be accessed by activating a cursor 2022 at a predetermined area. In the present example, the cursor 2022 is placed in a predetermined area designated by arrows 2012. A menu 2023 is then displayed indicating that a word processing application (Microsoft Word, in this example) and a file folder is in overflow.

FIG. 20C also illustrates taskbar buttons being placed into overflow with the addition of more taskbar buttons to the taskbar. In this example, a new rich presentation taskbar button 2009 is added to the taskbar. As a result, another taskbar button is placed into overflow. In this case, the simple word processing application taskbar window (2004 in FIG. 20B) is placed into overflow as indicated by the double arrows 2011.

Selection of which application to place into overflow in these examples may depend on user preferences or needs in the particular situation. For example, rich presentation taskbar buttons (such as the media player taskbar button or the instant messaging application taskbar button) may be preserved over simple taskbar buttons (e.g., the "My Documents" taskbar button and the word processing application taskbar button). In this example, the simple taskbar buttons are placed in overflow first. After there are no simple taskbar buttons in the taskbar, then rich presentation taskbar buttons may be placed into overflow. In this example, rich presentation taskbar buttons would be placed into overflow only after all simple taskbar buttons are already placed into overflow.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

We claim:

1. In a computer system with a display device, a method of displaying a taskbar button on a taskbar comprising:
    creating a rich presentation taskbar button for an application, wherein the creation occurs independently of the application performing a process and wherein the rich presentation taskbar button enables control of a plurality of functions within the application;
    receiving from the application at least a portion of a conversation thread to be displayed in the rich presentation taskbar button, the at least a portion of the conversation thread being associated with said application; and
    displaying, on the taskbar said rich presentation taskbar button, wherein the at least a portion of the conversation thread is displayed on the rich presentation taskbar button;
    wherein the application includes an instant-messaging application and the at least a portion of the conversation thread comprises text describing one or more of a most recently received message and a most recently sent message.

2. The method of claim 1, wherein the rich presentation taskbar button is usable to receive text that is input by a user and that is to be included in an outgoing instant message.

3. The method of claim 1 wherein said rich presentation taskbar button further includes a display element that is usable to control an operation of said application.

4. The method of claim 3 further comprising receiving a selection of the at least one display element wherein selection of the at least one display element causes the application to perform a corresponding operation.

5. The method of claim 1 further comprising receiving thumbnail content information corresponding to the application and displaying a thumbnail corresponding to the thumbnail content information.

6. The method of claim 5 wherein the thumbnail is displayed adjacent to the rich presentation taskbar button.

7. The method of claim 5 wherein said step of displaying a thumbnail is performed when a cursor is hovered over a predetermined location on the rich presentation taskbar button.

8. The method of claim 7 further comprising dismissing the displayed thumbnail when the cursor is moved away from said predetermined location.

9. The method of claim 7 wherein the displayed thumbnail remains displayed when the cursor is moved away from said predetermined location.

10. The method of claim 9 further comprising dismissing the displayed thumbnail after a predetermined display element is selected.

11. The method of claim 1 further comprising displaying said rich presentation taskbar button with at least one existing displayed taskbar button, said at least one existing displayed taskbar button being a simple taskbar button.

12. The method of claim 11 wherein said rich presentation taskbar button is displayed at substantially the same size as the simple taskbar button.

13. The method of claim 11 wherein said simple taskbar button is displayed at a smaller size than said rich presentation taskbar button and wherein both of the simple taskbar button and the rich presentation taskbar button are displayed on the taskbar.

14. The method of claim 11 wherein at least two simple taskbar buttons are displayed and when said rich presentation taskbar button is displayed, the at least two simple taskbar buttons are combined by taskbar button consolidation.

15. The method of claim 11 wherein at least one simple taskbar button is placed on an overflow menu when the rich presentation taskbar button is displayed.

16. The method of claim 1 further comprising creating a simple taskbar button for said application wherein said step of displaying further comprises displaying said rich presentation taskbar button only if at least a portion of a window corresponding to said application is not visible on the display.

17. The method of claim 16 further comprising displaying said simple taskbar button if the window corresponding to said application is visible on the display.

18. The method of claim 16 further comprising:
displaying the window corresponding to the application on the display;
displaying the simple taskbar button in place of the displayed rich presentation taskbar button after displaying the window corresponding to the application on the display.

19. The method of claim 18 further comprising:
removing the display of at least a portion of the window corresponding to the application;
displaying the rich presentation taskbar button in place of the simple taskbar button after said removing step.

20. The method of claim 1 further comprising the steps of:
creating a simple taskbar button for the application;
displaying the simple taskbar button in place of the displayed rich presentation taskbar button if a window corresponding to the application is displayed on the display.

21. A computer-readable storage medium comprising executable code for performing the steps of:
creating a rich presentation taskbar button for an instant-messaging application independently of the instant-messaging application performing a process, wherein the rich presentation taskbar button enables control of at least one function within the instant-messaging application;
receiving from the instant-messaging application content to be displayed in the rich presentation taskbar button, said content to be displayed being associated with said instant-messaging application and comprising a message that was recently received by the instant-messaging application;
displaying said rich presentation taskbar button, the displayed rich presentation taskbar button comprising the message; and
receiving text data that is input into the rich presentation taskbar button and that describes an outgoing message to be sent by the instant-messaging application.

22. In a computer system with a display, a graphical user interface comprising a rich presentation taskbar button that is associated with an instant-messaging application, wherein the rich presentation taskbar button is displayed in combination with a portion of a conversation thread that is provided by the instant-messaging application, wherein a thumbnail that depicts the conversation thread is displayed adjacent to the rich presentation taskbar button, and wherein the rich presentation taskbar button receives textual input to be included in an outgoing instant message.

23. The graphical user interface of claim 22 wherein the conversation thread that is displayed in the rich presentation taskbar button is dynamically updated in the rich presentation taskbar button as another instant message is one or more of received and sent.

24. The graphical user interface of claim 22 wherein a window corresponding to the application is obscured on the display by another display element.

25. The graphical user interface of claim 22 wherein the application is an instant messaging application and wherein the rich presentation taskbar button includes an interactive control display element, which receives and displays text input.

26. The graphical user interface of claim 25 wherein the rich presentation taskbar button further comprises at least a portion of an incoming message.

* * * * *

UNITED STATES PATENT AND TRADEMARK OFFICE
CERTIFICATE OF CORRECTION

PATENT NO. : 7,665,031 B2 Page 1 of 1
APPLICATION NO. : 11/006751
DATED : February 16, 2010
INVENTOR(S) : Matthews et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 662 days.

Signed and Sealed this

Twenty-eighth Day of December, 2010

David J. Kappos
*Director of the United States Patent and Trademark Office*